(12) United States Patent
Hoagland et al.

(10) Patent No.: US 9,984,126 B2
(45) Date of Patent: May 29, 2018

(54) IDENTIFYING RELEVANT FEED ITEMS TO DISPLAY IN A FEED OF AN ENTERPRISE SOCIAL NETWORKING SYSTEM

(71) Applicant: salesforce.com, inc., San Francisco, CA (US)

(72) Inventors: Megan Danielle Hoagland, Seattle, WA (US); Scott Douglas White, Seattle, WA (US); Jonathan Pappas, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 493 days.

(21) Appl. No.: 14/445,950

(22) Filed: Jul. 29, 2014

(65) Prior Publication Data

US 2014/0337436 A1    Nov. 13, 2014

Related U.S. Application Data

(63) Continuation-in-part of application No. 13/946,632, filed on Jul. 19, 2013, now Pat. No. 9,367,626.

(60) Provisional application No. 61/859,565, filed on Jul. 29, 2013, provisional application No. 61/859,570, filed on Jul. 29, 2013, provisional application No. 61/674,452, filed on Jul. 23, 2012.

(51) Int. Cl.
| *G06F 7/00* | (2006.01) |
|---|---|
| *G06F 17/30* | (2006.01) |
| *H04L 12/58* | (2006.01) |
| *G06Q 50/00* | (2012.01) |
| *G06F 15/16* | (2006.01) |

(52) U.S. Cl.
CPC .. *G06F 17/30516* (2013.01); *G06F 17/30867* (2013.01); *G06Q 50/01* (2013.01); *H04L 51/16* (2013.01)

(58) Field of Classification Search
CPC ........ G06F 17/30867; G06F 17/30516; G06Q 50/01; H04L 51/16
USPC .......................................... 707/754
See application file for complete search history.

(56) References Cited

U.S. PATENT DOCUMENTS

| 5,577,188 A | 11/1996 | Zhu |
|---|---|---|
| 5,608,872 A | 3/1997 | Schwartz et al. |

(Continued)

OTHER PUBLICATIONS

"Google Plus Users", Google+Ripples, Oct. 31, 2011 [retrieved on Feb. 21, 2012 from Internet at http://www.googleplusers.com/google-ripples.html], 3 pages.

*Primary Examiner* — Usmaan Saeed
*Assistant Examiner* — Brian E. Weinrich
(74) *Attorney, Agent, or Firm* — Weaver Austin Villeneuve & Sampson LLP

(57) ABSTRACT

Disclosed are techniques for identifying data items to display in a feed of an enterprise social networking system. A first subset of data items is identified as associated with an inner circle of data sources with which a user interacts at or exceeding a designated frequency, a second subset of data items is identified as associated with an interest graph associated with the user, and a third subset of data items is identified as associated with a group or an organization. A highlights feed can be displayed with different channels, where a first channel is defined by the first subset of data items, a second channel is defined by the second subset of data items, and a third channel is defined by the third subset of data items.

20 Claims, 16 Drawing Sheets

(56) References Cited

U.S. PATENT DOCUMENTS

| | | |
|---|---|---|
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 5,983,227 A | 11/1999 | Nazem et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya et al. |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Aly Assal et al. |
| 7,945,653 B2 | 5/2011 | Zukerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 9,367,626 B2 | 6/2016 | Pappas |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |

(56) References Cited

U.S. PATENT DOCUMENTS

| | | |
|---|---|---|
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2007/0061393 A1* | 3/2007 | Moore ............... G06F 17/3089 709/201 |
| 2007/0061487 A1* | 3/2007 | Moore ............. G06F 17/30575 709/246 |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2010/0131455 A1* | 5/2010 | Logan ............... G06F 17/30905 707/602 |
| 2011/0212430 A1* | 9/2011 | Smithmier ............... G09B 5/06 434/322 |
| 2011/0218958 A1 | 9/2011 | Warshavsky et al. |
| 2011/0247051 A1 | 10/2011 | Bulumulla et al. |
| 2012/0042218 A1 | 2/2012 | Cinarkaya et al. |
| 2012/0054369 A1* | 3/2012 | Shafi ................. G06F 17/30893 709/246 |
| 2012/0224743 A1* | 9/2012 | Rodriguez ............ G06F 3/0482 382/103 |
| 2012/0233137 A1 | 9/2012 | Jakobson et al. |
| 2012/0254917 A1* | 10/2012 | Burkitt .............. G06F 17/30867 725/40 |
| 2012/0290407 A1 | 11/2012 | Hubbard et al. |
| 2012/0296919 A1* | 11/2012 | Sinha ................ G06F 17/30516 707/749 |
| 2013/0073972 A1* | 3/2013 | Yung ..................... G06Q 50/01 715/738 |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2014/0101247 A1 | 4/2014 | Pappas |
| 2014/0136521 A1 | 5/2014 | Pappas |
| 2014/0229407 A1 | 8/2014 | White |
| 2014/0359537 A1 | 12/2014 | Jakobson et al. |
| 2015/0006289 A1 | 1/2015 | Jakobson et al. |
| 2015/0007050 A1 | 1/2015 | Jakobson et al. |
| 2015/0095162 A1 | 4/2015 | Jakobson et al. |
| 2015/0142596 A1 | 5/2015 | Jakobson et al. |
| 2015/0172563 A1 | 6/2015 | Jakobson et al. |
| 2015/0358303 A1 | 12/2015 | Hui et al. |

* cited by examiner

| User ID 501 | Inner Circle Object ID 503 | Inner Circle User ID 505 |
|---|---|---|
| U919 | O615, O712, O987... | U921, U981, U100... |
| U920 | O489, O213, O912... | U1400, U910, U111... |
| U921 | O615, O12, O451... | U919, U900, U202... |

⋮

Inner Circle Table 500

| User ID 511 | Global Influence Value 513 |
|---|---|
| U098 | 531 |
| U419 | 256 |
| U999 | 098 |
| U120 | 087 |

⋮

Global Influence Table 510

| Topic ID 521 | User ID 523 | Topical Influence Value 525 |
|---|---|---|
| T199 | U521 | 145 |
| T199 | U777 | 43 |
| T199 | U098 | 099 |
| T199 | U761 | 003 |

⋮

Topical Influence Table 520

| User ID 531 | Topic ID 533 |
|---|---|
| U919 | T412 |
| U919 | T212 |
| U919 | T909 |
| U920 | T511 |

⋮

Topical Relevance Table 530

FIGURE 5

| Topic ID 801 | Associated information update IDs 811 |
|---|---|
| T331 | P522 |
| T331 | C123 |
| T332 | FC140 |

⋮

Topic Table 800

IDENTIFYING RELEVANT FEED ITEMS TO DISPLAY IN A FEED OF AN ENTERPRISE SOCIAL NETWORKING SYSTEM

PRIORITY AND RELATED APPLICATION DATA

This patent document claims priority to co-pending and commonly assigned U.S. Provisional Patent Application No. 61/859,565, titled "Relevancy in a Social Network," to Hoagland et al., filed Jul. 29, 2013, and to U.S. Provisional Patent Application No. 61/859,570, titled "Relevancy in a Social Network," to Hoagland et al., filed Jul. 29, 2013, and is a continuation-in-part of co-pending and commonly assigned U.S. patent application Ser. No. 13/946,632, titled "Computer Implemented Methods and Apparatus for Implementing a Topical-Based Highlights Filter," to Pappas, filed on Jul. 19, 2013, which claims priority to U.S. Provisional Patent Application No. 61/674,452, titled "System And Method For Implementing A Topical-Based Highlights Filter", to Pappas, filed on Jul. 23, 2012, which are each hereby incorporated by reference in its entirety and for all purposes.

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This patent document relates generally to providing on-demand services in an online social network using a database system and, more specifically, to techniques for filtering data in the social network.

BACKGROUND

"Cloud computing" services provide shared resources, software, and information to computers and other devices upon request. In cloud computing environments, software can be accessible over the Internet rather than installed locally on in-house computer systems. Cloud computing typically involves over-the-Internet provision of dynamically scalable and often virtualized resources. Technological details can be abstracted from the users, who no longer have need for expertise in, or control over, the technology infrastructure "in the cloud" that supports them.

Database resources can be provided in a cloud computing context. However, using conventional database management techniques, it is difficult to know about the activity of other users of a database system in the cloud or other network. For example, the actions of a particular user, such as a salesperson, on a database resource may be important to the user's boss. The user can create a report about what the user has done and send it to the boss, but such reports may be inefficient, not timely, and incomplete. Also, it may be difficult to identify other users who might benefit from the information in the report.

BRIEF DESCRIPTION OF THE DRAWINGS

The included drawings are for illustrative purposes and serve only to provide examples of possible structures and operations for the disclosed inventive systems, apparatus, and methods for identifying relevant feed items to display in a feed of an enterprise social networking system. These drawings in no way limit any changes in form and detail that may be made by one skilled in the art without departing from the spirit and scope of the disclosed implementations.

FIG. 5 shows examples of database tables that may be used in tracking highlight sources according to some implementations.

FIG. 8 shows an example of a topic table 800 that may be used in tracking information updates and topic associations in accordance with some implementations.

FIG. 10B shows an example of an overlay window 1050 showing an expanded view of social network data derived from an inner circle highlight source according to some implementations.

DETAILED DESCRIPTION

Figure 1A:
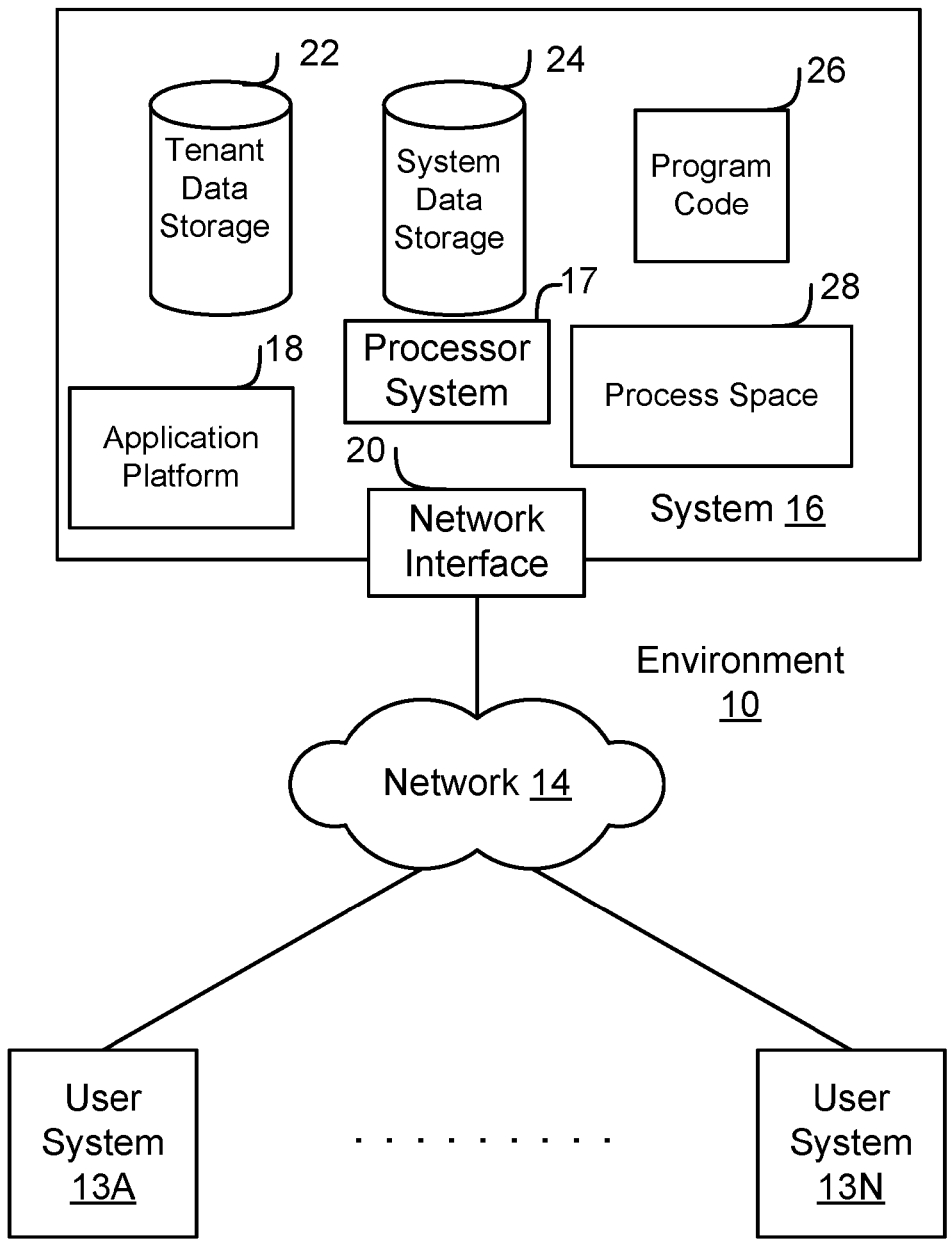
FIG. 1A shows a block diagram of an example of an environment 10 in which an on-demand database service can be used in accordance with some implementations.

Examples of systems, apparatus, and methods according to the disclosed implementations are described in this section. These examples are being provided solely to add context and aid in the understanding of the disclosed implementations. It will thus be apparent to one skilled in the art that implementations may be practiced without some or all of these specific details. In other instances, certain process/method operations, also referred to herein as "blocks," have not been described in detail in order to avoid unnecessarily obscuring implementations. Other applications are possible, such that the following examples should not be taken as definitive or limiting either in scope or setting.

In the following detailed description, references are made to the accompanying drawings, which form a part of the description and in which are shown, by way of illustration, specific implementations. Although these implementations are described in sufficient detail to enable one skilled in the art to practice the disclosed implementations, it is understood that these examples are not limiting, such that other implementations may be used and changes may be made without departing from their spirit and scope. For example, the blocks of methods shown and described herein are not necessarily performed in the order indicated. It should also be understood that the methods may include more or fewer blocks than are indicated. In some implementations, blocks described herein as separate blocks may be combined. Conversely, what may be described herein as a single block may be implemented in multiple blocks.

Various implementations described or referenced herein are directed to different methods, apparatus, systems, and computer-readable storage media for filtering content to display in an online social network, also referred to herein as a social networking system. One example of an online social network is Chatter®, provided by salesforce.com, inc. of San Francisco, Calif. Online social networks are increasingly becoming a common way to facilitate communication among people and groups of people, any of whom can be recognized as users of a social networking system. Some online social networks can be implemented in various settings, including organizations, e.g., enterprises such as companies or business partnerships, academic institutions, or groups within such an organization. For instance, Chatter® can be used by employee users in a division of a business organization to share data, communicate, and collaborate with each other for various purposes.

In some online social networks, users can access one or more information feeds, which include information updates presented as items or entries in the feed. Such a feed item can include a single information update or a collection of individual information updates. A feed item can include various types of data including character-based data, audio data, image data and/or video data. An information feed can be displayed in a graphical user interface (GUI) on a display device such as the display of a computing device as described below. The information updates can include various social network data from various sources and can be stored in an on-demand database service environment. In some implementations, the disclosed methods, apparatus, systems, and computer-readable storage media may be configured or designed for use in a multi-tenant database environment.

In some implementations, an online social network may allow a user to follow data objects in the form of records such as cases, accounts, or opportunities, in addition to following individual users and groups of users. The "following" of a record stored in a database, as described in greater detail below, allows a user to track the progress of that record. Updates to the record, also referred to herein as changes to the record, are one type of information update that can occur and be noted on an information feed such as a record feed or a news feed of a user subscribed to the record. Examples of record updates include field changes in the record, updates to the status of a record, as well as the creation of the record itself. Some records are publicly accessible, such that any user can follow the record, while other records are private, for which appropriate security clearance/permissions are a prerequisite to a user following the record.

Information updates can include various types of updates, which may or may not be linked with a particular record. For example, information updates can be user-submitted messages or can otherwise be generated in response to user actions or in response to events. Examples of messages include: posts, comments, indications of a user's personal preferences such as "likes" and "dislikes", updates to a user's status, uploaded files, and hyperlinks to social network data or other network data such as various documents and/or web pages on the Internet. Posts can include alphanumeric or other character-based user inputs such as words, phrases, statements, questions, emotional expressions, and/or symbols. Comments generally refer to responses to posts, such as words, phrases, statements, answers, questions, and reactionary emotional expressions and/or symbols. Multimedia data can be included in, linked with, or attached to a post or comment. For example, a post can include textual statements in combination with a JPEG image or animated image. A like or dislike can be submitted in response to a particular post or comment. Examples of uploaded files include presentations, documents, multimedia files, and the like.

Users can follow a record by subscribing to the record, as mentioned above. Users can also follow other entities such as other types of data objects, other users, and groups of users. Feed tracked updates regarding such entities are one type of information update that can be received and included in the user's news feed. Any number of users can follow a particular entity and thus view information updates pertaining to that entity on the users' respective news feeds. In some social networks, users may follow each other by establishing connections with each other, sometimes referred to as "friending" one another. By establishing such a connection, one user may be able to see information generated by, generated about, or otherwise associated with another user. For instance, a first user may be able to see information posted by a second user to the second user's personal social network page. One implementation of such a personal social network page is a user's profile page, for example, in the form of a web page representing the user's profile. In one example, when the first user is following the second user, the first user's news feed can receive a post from the second user submitted to the second user's profile feed, also referred to herein as the user's "wall," which is one example of an information feed displayed on the user's profile page.

In some implementations, an information feed may be specific to a group of users of an online social network. For instance, a group of users may publish a news feed. Members of the group may view and post to this group feed in accordance with a permissions configuration for the feed and the group. Information updates in a group context can also include changes to group status information.

In some implementations, when data such as posts or comments input from one or more users are submitted to an information feed for a particular user, group, object, or other construct within an online social network, an email notification or other type of network communication may be transmitted to all users following the user, group, or object in addition to the inclusion of the data as a feed item in one or more feeds, such as a user's profile feed, a news feed, or a record feed. In some online social networks, the occurrence of such a notification is limited to the first instance of a published input, which may form part of a larger conversation. For instance, a notification may be transmitted for an initial post, but not for comments on the post. In some other implementations, a separate notification is transmitted for each such information update.

Some of the disclosed techniques can be implemented to filter content in an online social network to increase relevancy of information provided to a user. In some implementations, the techniques can be implemented to consider and aggregate information generated from multiple "graphs" of an online social network. For example, information gleaned from the social graph of a user may be aggregated with other data available from the social network to provide information on where to find better information on a social network feed. Information generated from the social graph can be aggregated and/or analyzed with information from a user's interest graph and/or sentiment graph in some instances, as explained in greater detail below. In some implementations, the techniques help identify and provide suggestions for pertinent information sources, thereby increasing the usefulness of the online social network. Some of the disclosed techniques may be implemented in an enterprise social network to increase the relevance of social network data to a user in a workplace setting, for example.

Some social networks make use of a social graph for mapping relationships between social network users. Relationships are formed between users that follow one another; a first user will follow a second user, and the second user's social network activities, such as comments, photographs, links, status updates, and product recommendations, will appear in both the second user's and the first user's respective social network feeds. In this fashion, the relative influential impact of the second user's activities will score higher on the social graph than similar activities by users not followed by the first user. This type of information can be used to suggest other users for the first user to follow, or may be used to identify relevant advertising.

In some conventional social networks, a suggestion to follow a user may appear when a first user follows a second user. The first user may be presented with a message that states "Followers of [second user] typically follow the following people." However, this suggestion may not be as relevant in in a workplace setting where an enterprise social network may be used differently than a consumer social network. Enterprise social network users may follow a number of people in their company, including various executives and management leaders outside of their immediate department, project team members, and the like. This does not necessarily mean that they are "friends" with or communicate closely with all of those followed people—they may only be interested in the content or information provided by those followed people. In contrast, in a consumer social network, a first user follows a second user primarily to receive status updates and converse on a social level. Put another way, in an enterprise social network, information is a chief reason that a first user follows a second user.

Some of the disclosed techniques provide relevant information to an enterprise social network user. In one example, the disclose techniques permit suggestions such as "Because of your role and/or your current responsibilities and/or your current team, you should follow this person/topic/object/record, etc." In some implementations, the disclosed techniques can consider highlights from two or more different highlight sources to provide relevant information and/or recommendations to a first user. Highlights can include information updates or other content posted or published to a social network. Examples include conversations, posts, comments, updates to a user's status, updates to a record, uploaded files, and hyperlinks to social network data or other network data such as various documents and/or web pages on the Internet. Highlight sources can include one or more collections of users, entities, and/or topics that are relevant to the first user. Examples of highlights include inner circle highlights; global influence highlights; topical highlights; and serendipity highlights. The combination of multiple types of highlights such as these can provide insight on the overlap between a social network user's social graph, interest graph, and sentiment graph. Moreover, this insight can be analyzed to provide contextual recommendations that have more relevance to an enterprise social network user.

In some implementations, a highlight source can be defined based on a level of interaction with the first user. For example, inner circle highlights can include content posted to a social network from a group of users with whom a first user interacts most. Outside of the context of an online setting, this may be equivalent to a person's closest friends or a person's team. In one example, a user's inner circle may be identified manually by the first user, or by monitoring the user's activity on the social network, or a combination of the two. In some implementations, the inner circle may include only users, or data objects, or non-human entities such as servers or devices having a presence on the social network, or a combination. In some implementations, content published by a user's inner circle may readily identify the topics or people most relevant to the user. In an implementation, an inner circle may change over time.

In some implementations, a highlight source can be defined in whole or in part based on an influence level in the online social network. Influence considers users, data objects, and other entities that have influence on the online social network. For example, global influence can consider those users that exert the most influence on a social network. Another example of an influence highlight source is a topical influence highlight source. Topical influence can consider those entities that exert influence on a topic in the online social network. Influence may be measured using a number of different metrics, including but not limited to, the number of followers of a user, the number of posts of the user that are "liked" or re-posted, the number of comments the user receives, etc. Other techniques may be used to measure influence on a social network. Influence may be used to identify topics or people that may be relevant to a single user or a group of users. Those users identified as influential may change over time. According to various implementations, data objects, records, or other entities having presence on a social network may have influence.

In some implementations, a highlight source can be defined in whole or in part based on topics of interest to a user, e.g., topics that a user most commonly discusses in his posted content. In some implementations, topics may be identified automatically by a system or manually by the user using a closed or open library of terms. In some implementations, the system that receives and processes social network feed activity can apply machine learning to build a library or database of topics, and can assign or suggest topics to the user based upon that learning. In some implementations, a combination of manual and machine processes for identifying and labeling content with topics may be used. According to various implementations, a list of relevant topics to a user or a group of users can change over time.

Another example of a highlight source is a serendipity highlight source. According to some implementations, serendipity highlights can include topics, users, data objects, records, or other entities accessible through the social network feed that may be of interest to a user, but do not fall within any particular inner circle, influence, or common topic framework. Serendipity highlights may consider the user's activity over time on the social network, and may also consider other users' activities to identify a pattern. In some implementations, serendipity highlights can be selected in part based on random sampling of content in the online social network.

Some of the disclosed techniques involve considering highlights from two or more highlight sources and aggregating data generated from each to identify and suggest information sources that may be relevant to a user. Some implementations also considers data available from other external social networks, such that the user's activities on consumer social networks such as Facebook®, Twitter®, LinkedIn®, Instagram®, Pinterest® and the like are also used to help identify and suggest information sources that may be relevant to a user. Information from consumer social networks can be part of an interest graph of a user, for example. Some of the disclosed techniques further analyze information from highlight sources in connection with feelings associated with information. These sentiments may be part of a sentiment graph of the user. For example, if a group of users or users within a group of users express a certain sentiment around a topic, e.g., positive or negative, this can alter whether information sources will be relevant to the user or group of users.

Some implementations of the disclosed systems, apparatus, methods, and computer program products are configured to identify relevant information to present as highlights in a social network feed. For example, any highlights can be presented in a dedicated "highlights feed" accessible to a given user that only includes highlighted feed items identified using the disclosed techniques. The disclosed techniques can be configured to essentially pull "need to know" information out of a universe of feeds and feed items and tailor a feed to have more relevant information. Relevancy determinations can be based on, for example, the identities of: users, what projects those users may be working on, any related tasks and actions, and/or the context in which those users are working. In this way, relevant information can be highlighted in a feed to allow users to work more efficiently.

In some implementations, an organizational interest graph is maintained as a data structure to provide information identifying topics, feed items, keywords and other data that is determined by a server to be important to an organization. By the same token, a user's interest graph can be configured to identify subject matter determined to be important to a user. Data structures also can be configured as an inner-circle and an external circle, in some implementations, to identify users, groups and other entities that are determined to be important to a given user. In some implementations, context information can be maintained to inform what actions a user takes and when those actions are taken.

In some implementations, an interface and data hub, referred to herein as a "highlights honeycomb", is provided on one or more servers to maintain the various categories of information described above. The highlights honeycomb can have communication ports connected to various channels of information to receive data related to the categories described above. The highlights honeycomb can be in communication with various data sources to retrieve various data such as information requested by a particular user, information about users having designated roles in an organization, and information or requests for information labeled or tagged as "urgent", by way of example.

The inner-circle mentioned above can identify users with whom a given user works closely, often in the setting of an enterprise or group within such an enterprise. In some implementations, users who qualify as a given user's inner-circle of friends or contacts can be determined according to various criteria. In one example, the top 3 or top 10 people with whom a user interacts most frequently define that user's inner circle. Various thresholds can be used and can vary from organization-to-organization. Other criteria can specify people who have defined roles or relationships with the user, and one criteria or a combination of criteria can be applied to determine the inner-circle. Criteria and thresholds can be optimized by machine learning for a particular user in some implementations.

Various entities in addition to or as an alternative to a user can be included in an inner-circle, such as database records. The techniques for identifying and maintaining an inner-circle can be applied to identify and include CRM objects such as opportunities, leads, contracts, contacts and accounts. For example, opportunity data and/or account data can be retrieved according to a user's designated role in some implementations. In some other implementations, such data can be identified independent of the user's role. Other service-oriented data objects such as cases and escalations can be identified, as can users belonging to designated communities or groups. For instance, users who post to specified community feeds can be identified.

In some implementations, an interest profile can be constructed to identify what may be most interesting to a user and to an organization or department of an organization of which the user is a member. The interest profile can identify types of objects with which the user interacts, for instance: sales accounts, explicit groups followed by the user, implicit topics followed based on an analysis of historical actions, events and entities such as other users and groups being followed. A context of the user can be used to dynamically adjust an interest profile based on current or recent events as well as user actions such as @mentions of people.

Various data can be highlighted, depending on the desired implementation. For example, a highlights feed can be constructed to inform a user of topics, groups, CRM objects, custom objects as well as other data constructs. In addition, highlights can be used to emphasize certain email messages, for instance, received during a designated time window. Highlights also can be used to rank search results of global searches in a cloud computing environment as well as search results of file searches for information most relevant to a particular user. By the same token, highlights can be used in the context of a messenger service to load contacts identified as being most relevant to a user and tailored to a certain context such as a calendar or particular publisher by way of example. Highlights services such as a highlights feed can be configured to be presented on a mobile computing device such as a smartphone or tablet with an appropriate graphical user interface configured to have selections for quick and easy interaction by a user.

In implementing a highlights feed, feed items can be assigned different weights, which are used to select items for the highlights feed and/or to rank items for positioning within the highlights feed, which often is separate from the user's news feed and other feeds to which a user has access. For example, a user can select one of a number of tabs in a user interface to view only the highlights feed. By way of example, feed items appearing in a group feed of certain groups of which a user is an active member, i.e., the user has published to the feed with some level of frequency or within a specified time period, can be included in the highlights feed. Thus, the user's attention can be immediately drawn to the feed items as soon as the user views the user interface. Other examples of feed items identified as highlights using the disclosed techniques can be a post or a record update on an important deal with which a user is involved, a post from the user's boss on an urgent matter, or a record update by a team member, by way of example.

Using the disclosed highlights techniques, various data stored or otherwise available in a social networking system, a CRM database, a marketing database, a communities database, a service database, and/or databases provided by organizations such as Data.com® and Work.com®, can be identified to present as a feed item. In some implementations, a highlights filter having one or more relevancy parameters can be used. Relevancy parameters can be applied to a feed item to determine a relevancy score, depending on which ones and how many parameters are satisfied. For instance, some parameters can be weighted or otherwise designated as being more important than other parameters. When scores are generated for any number feed items, the scores can be ranked and/or compared with a threshold value.

In some implementations, one or more feed items having scores of a certain rank and/or traversing the threshold can be selected to be included in a highlights feed. In some other implementations, highlight indicators can graphically identify selected feed item(s) according to their score. Such information can then be provided to a display device so that the selected feed item(s) in the presentation of a news feed are graphically highlighted. By way of example, a highlight indicator can specify: a color, a background shade, an animation, an image, video data, audio data, a removal of a feed item, a graphical distortion, and/or a graphical opacity used to affect the presentation of a displayed feed item. In some implementations, machine learning techniques can be practiced to refine the parameters and/or weights of a highlights filter, and heuristic analysis and/or regression analysis also or alternatively can be performed.

Various examples of relevancy parameters are contemplated, any one or a combination of which can be used to construct a highlights filter. Non-limiting examples of relevancy parameters can specify: a friend, a user, a user ID, an interest of a user, an e-mail address, a group, a subgroup, a role in group, an organization, an interest of an organization, an entity with which a user has interacted, a keyword, a subject, a length of a post, a time of a post, a department, a hashtag, a flag, a character, a word, a phrase, an expression, a command, a symbol, an attachment, a URL address, a hyperlink, a header, a geographic location of the display device, context data indicating one or more user actions and related timing information, an urgency tag indicating whether selected data is urgent, and any user-defined criterion. Data can be identified as "urgent" when a system administrator or user with appropriate permissions specifies data which an entire organization or group within an organization should be made aware of immediately. User-defined criteria can identify objects posted through a publisher, posted files shared by peers in a department of an organization, coworkers, files that a user is working on, etc.

These and other implementations may be embodied in various types of hardware, software, firmware, and combinations thereof. For example, some techniques disclosed herein may be implemented, at least in part, by computer-readable media that include program instructions, state information, etc., for performing various services and operations described herein. Examples of program instructions include both machine code, such as produced by a compiler, and files containing higher-level code that may be executed by a computing device such as a server or other data processing apparatus using an interpreter. Examples of computer-readable media include, but are not limited to, magnetic media such as hard disks, floppy disks, and magnetic tape; optical media such as CD-ROM disks; magneto-optical media; and hardware devices that are specially configured to store program instructions, such as read-only memory ("ROM") devices and random access memory ("RAM") devices. These and other features of the disclosed implementations will be described in more detail below with reference to the associated drawings.

The term "multi-tenant database system" can refer to those systems in which various elements of hardware and software of a database system may be shared by one or more customers. For example, a given application server may simultaneously process requests for a great number of customers, and a given database table may store rows of data such as feed items for a potentially much greater number of customers. The term "query plan" generally refers to one or more operations used to access information in a database system.

A "user profile" or "user's profile" is generally configured to store and maintain data about a given user of the database system. The data can include general information, such as name, title, phone number, a photo, a biographical summary, and a status, e.g., text describing what the user is currently doing. As mentioned below, the data can include messages created by other users. Where there are multiple tenants, a user is typically associated with a particular tenant. For example, a user could be a salesperson of a company, which is a tenant of the database system that provides a database service.

The term "record" generally refers to a data entity, such as an instance of a data object created by a user of the database service, for example, about a particular (actual or potential) business relationship or project. The data object can have a data structure defined by the database service (a standard object) or defined by a user (custom object). For example, a record can be for a business partner or potential business partner (e.g., a client, vendor, distributor, etc.) of the user, and can include information describing an entire company, subsidiaries, or contacts at the company. As another example, a record can be a project that the user is working on, such as an opportunity (e.g., a possible sale) with an existing partner, or a project that the user is trying to get. In one implementation of a multi-tenant database system, each record for the tenants has a unique identifier stored in a common table. A record has data fields that are defined by the structure of the object (e.g., fields of certain data types and purposes). A record can also have custom fields defined by a user. A field can be another record or include links thereto, thereby providing a parent-child relationship between the records.

The terms "information feed" and "feed" are used interchangeably herein and generally refer to a combination (e.g., a list) of feed items or entries with various types of information and data. Such feed items can be stored and maintained in one or more database tables, e.g., as rows in the table(s), that can be accessed to retrieve relevant information to be presented as part of a displayed feed. The term "feed item" (or feed element) refers to an item of information, which can be presented in the feed such as a post submitted by a user. Feed items of information about a user can be presented in a user's profile feed of the database, while feed items of information about a record can be presented in a record feed in the database, by way of example. A profile feed and a record feed are examples of different information feeds. A second user following a first user and a record can receive the feed items associated with the first user and the record for display in the second user's news feed, which is another type of information feed. In some implementations, the feed items from any number of followed users and records can be combined into a single information feed of a particular user.

As examples, a feed item can be a message, such as a user-generated post of text data, and a feed tracked update to a record or profile, such as a change to a field of the record. Feed tracked updates are described in greater detail below. A feed can be a combination of messages and feed tracked updates. Messages include text created by a user, and may include other data as well. Examples of messages include posts, user status updates, and comments. Messages can be created for a user's profile or for a record. Posts can be created by various users, potentially any user, although some restrictions can be applied. As an example, posts can be made to a wall section of a user's profile page (which can include a number of recent posts) or a section of a record that includes multiple posts. The posts can be organized in chronological order when displayed in a graphical user interface (GUI), for instance, on the user's profile page, as part of the user's profile feed. In contrast to a post, a user status update changes a status of a user and can be made by that user or an administrator. A record can also have a status, the update of which can be provided by an owner of the record or other users having suitable write access permissions to the record. The owner can be a single user, multiple users, or a group. In one implementation, there is only one status for a record.

In some implementations, a comment can be made on any feed item. In some implementations, comments are organized as a list explicitly tied to a particular feed tracked update, post, or status update. In some implementations, comments may not be listed in the first layer (in a hierarchal sense) of feed items, but listed as a second layer branching from a particular first layer feed item.

A "feed tracked update," also referred to herein as a "feed update," is one type of information update and generally refers to data representing an event. A feed tracked update can include text generated by the database system in response to the event, to be provided as one or more feed items for possible inclusion in one or more feeds. In one implementation, the data can initially be stored, and then the database system can later use the data to create text for describing the event. Both the data and/or the text can be a feed tracked update, as used herein. In various implementations, an event can be an update of a record and/or can be triggered by a specific action by a user. Which actions trigger an event can be configurable. Which events have feed tracked updates created and which feed updates are sent to which users can also be configurable. Messages and feed updates can be stored as a field or child object of the record. For example, the feed can be stored as a child object of the record.

A "group" is generally a collection of users. In some implementations, the group may be defined as users with a same or similar attribute, or by membership. In some implementations, a "group feed", also referred to herein as a "group news feed", includes one or more feed items about any user in the group. In some implementations, the group feed also includes information updates and other feed items that are about the group as a whole, the group's purpose, the group's description, and group records and other objects stored in association with the group. Threads of information updates including group record updates and messages, such as posts, comments, likes, etc., can define group conversations and change over time.

An "entity feed" or "record feed" generally refers to a feed of feed items about a particular record in the database, such as feed tracked updates about changes to the record and posts made by users about the record. An entity feed can be composed of any type of feed item. Such a feed can be displayed on a page such as a web page associated with the record, e.g., a home page of the record. As used herein, a "profile feed" or "user's profile feed" is a feed of feed items about a particular user. In one example, the feed items for a profile feed include posts and comments that other users make about or send to the particular user, and status updates made by the particular user. Such a profile feed can be displayed on a page associated with the particular user. In another example, feed items in a profile feed could include posts made by the particular user and feed tracked updates initiated based on actions of the particular user.

Systems, apparatus, and methods are provided for implementing enterprise level social and business information networking. Such implementations can provide more efficient use of a database system. For instance, a user of a database system may not easily know when important information in the database has changed, e.g., about a project or client. Implementations can provide feed tracked updates about such changes and other events, thereby keeping users informed.

By way of example, a user can update a record, e.g., an opportunity such as a possible sale of 1000 computers. Once the record update has been made, a feed tracked update about the record update can then automatically be provided, e.g., in a feed, to anyone subscribing to the opportunity or to the user. Thus, the user does not need to contact a manager regarding the change in the opportunity, since the feed tracked update about the update is sent via a feed right to the manager's feed page or other page.

Next, mechanisms and methods for providing systems implementing enterprise level social and business information networking will be described with reference to several implementations. First, an overview of an example of a database system is described, and then examples of tracking events for a record, actions of a user, and messages about a user or record are described. Various implementations about the data structure of feeds, customizing feeds, user selection of records and users to follow, generating feeds, and displaying feeds are also described.

FIG. 1A shows a block diagram of an example of an environment 10 in which an on-demand database service can be used in accordance with some implementations. Environment 10 may include user systems 13A-13N, network 14, database system 16, processor system 17, application platform 18, network interface 20, tenant data storage 22, system data storage 24, program code 26, and process space 28. In other implementations, environment 10 may not have all of these components and/or may have other components instead of, or in addition to, those listed above.

Environment 10 is an environment in which an on-demand database service exists. A user system 13A may be implemented as any computing device(s) or other data processing apparatus such as a machine or system that is used by a user to access a database system 16. For example, any of user systems 13A-13N can be a handheld computing device, a mobile phone, a laptop computer, a work station, and/or a network of such computing devices. As illustrated in FIG. 1A (and in more detail in FIG. 1B) user systems 13A-13N might interact via a network 14 with an on-demand database service, which is implemented in the example of FIG. 1A as database system 16.

An on-demand database service, implemented using system 16 by way of example, is a service that is made available to outside users, who do not need to necessarily be concerned with building and/or maintaining the database system. Instead, the database system may be available for their use when the users need the database system, i.e., on the demand of the users. Some on-demand database services may store information from one or more tenants into tables of a common database image to form a multi-tenant database system (MTS). A database image may include one or more database objects. A relational database management system (RDBMS) or the equivalent may execute storage and retrieval of information against the database object(s). Application platform 18 may be a framework that allows the applications of system 16 to run, such as the hardware and/or software, e.g., the operating system. In some implementations, application platform 18 enables creation, managing and executing one or more applications developed by the provider of the on-demand database service, users accessing the on-demand database service via user systems 13A-13N, or third party application developers accessing the on-demand database service via user systems 13A-13N.

The users of user systems 13A-13N may differ in their respective capacities, and the capacity of a particular user system 13A might be entirely determined by permissions (permission levels) for the current user. For example, where a salesperson is using a particular user system 13A to interact with system 16, that user system has the capacities allotted to that salesperson. However, while an administrator is using that user system to interact with system 16, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level, also called authorization.

Network 14 is any network or combination of networks of devices that communicate with one another. For example, network 14 can be any one or any combination of a LAN (local area network), WAN (wide area network), telephone network, wireless network, point-to-point network, star network, token ring network, hub network, or other appropriate configuration. Network 14 can include a TCP/IP (Transfer Control Protocol and Internet Protocol) network, such as the global internetwork of networks often referred to as the "Internet" with a capital "I." The Internet will be used in many of the examples herein. However, it should be understood that the networks that the present implementations might use are not so limited, although TCP/IP is a frequently implemented protocol.

User systems 13A-13N might communicate with system 16 using TCP/IP and, at a higher network level, use other common Internet protocols to communicate, such as HTTP, FTP, AFS, WAP, etc. In an example where HTTP is used, user system 13A might include an HTTP client commonly referred to as a "browser" for sending and receiving HTTP signals to and from an HTTP server at system 16. Such an HTTP server might be implemented as the sole network interface 20 between system 16 and network 14, but other techniques might be used as well or instead. In some implementations, the network interface 20 between system 16 and network 14 includes load sharing functionality, such as round-robin HTTP request distributors to balance loads and distribute incoming HTTP requests evenly over a plurality of servers. At least for users accessing system 16, each of the plurality of servers has access to the MTS' data; however, other alternative configurations may be used instead.

In one implementation, system 16, shown in FIG. 1A, implements a web-based customer relationship management (CRM) system. For example, in one implementation, system 16 includes application servers configured to implement and execute CRM software applications as well as provide related data, code, forms, web pages and other information to and from user systems 13A-13N and to store to, and retrieve from, a database system related data, objects, and Webpage content. With a multi-tenant system, data for multiple tenants may be stored in the same physical database object in tenant data storage 22, however, tenant data typically is arranged in the storage medium(s) of tenant data storage 22 so that data of one tenant is kept logically separate from that of other tenants so that one tenant does not have access to another tenant's data, unless such data is expressly shared. In certain implementations, system 16 implements applications other than, or in addition to, a CRM application. For example, system 16 may provide tenant access to multiple hosted (standard and custom) applications, including a CRM application. User (or third party developer) applications, which may or may not include CRM, may be supported by the application platform 18, which manages creation, storage of the applications into one or more database objects and executing of the applications in a virtual machine in the process space of the system 16.

Figure 1B:
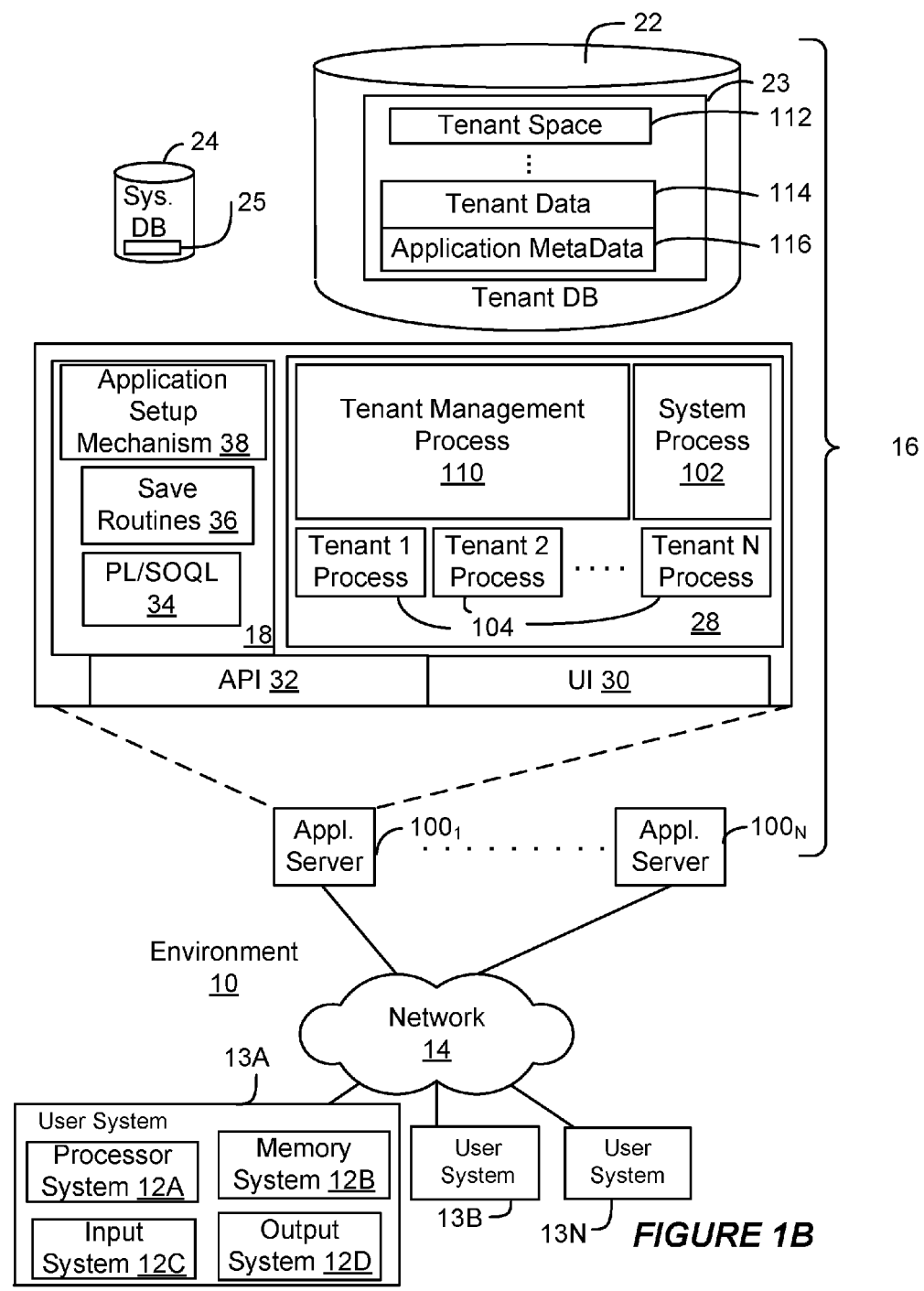
FIG. 1B shows a block diagram of an example of some implementations of elements of FIG. 1A and various possible interconnections between these elements.

One arrangement for elements of system 16 is shown in FIGS. 1A and 1B, including a network interface 20, application platform 18, tenant data storage 22 for tenant data 23, system data storage 24 for system data 25 accessible to system 16 and possibly multiple tenants, program code 26 for implementing various functions of system 16, and a process space 28 for executing MTS system processes and tenant-specific processes, such as running applications as part of an application hosting service. Additional processes that may execute on system 16 include database indexing processes.

Several elements in the system shown in FIG. 1A include conventional, well-known elements that are explained only briefly here. For example, each of user systems 13A-13N could include a desktop personal computer, workstation, laptop, PDA, cell phone, or any wireless access protocol (WAP) enabled device or any other computing device capable of interfacing directly or indirectly to the Internet or other network connection. The term "computing device" is also referred to herein simply as a "computer". User system 13A typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 13A to access, process and view information, pages and applications available to it from system 16 over network 14. Each of user systems 13A-13N also typically includes one or more user input devices, such as a keyboard, a mouse, trackball, touch pad, touch screen, pen or the like, for interacting with a graphical user interface (GUI) provided by the browser on a display (e.g., a monitor screen, LCD display, etc.) of the computing device in conjunction with pages, forms, applications and other information provided by system 16 or other systems or servers. For example, the user interface device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

According to one implementation, each of user systems 13A-13N and all of its components are operator configurable using applications, such as a browser, including computer code run using a central processing unit such as an Intel Pentium® processor or the like. Similarly, system 16 (and additional instances of an MTS, where more than one is present) and all of its components might be operator configurable using application(s) including computer code to run using processor system 17, which may be implemented to include a central processing unit, which may include an Intel Pentium® processor or the like, and/or multiple processor units. Non-transitory computer-readable media can have instructions stored thereon/in, that can be executed by or used to program a computing device to perform any of the methods of the implementations described herein. Computer program code 26 implementing instructions for operating and configuring system 16 to intercommunicate and to process web pages, applications and other data and media content as described herein is preferably downloadable and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any other type of computer-readable medium or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for the disclosed implementations can be realized in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to some implementations, each system 16 is configured to provide web pages, forms, applications, data and media content to user (client) systems 13A-13N to support the access by user systems 13A-13N as tenants of system 16. As such, system 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to refer to a computing device or system, including processing hardware and process space(s), an associated storage medium such as a memory device or database, and, in some instances, a database application (e.g., OODBMS or RDBMS) as is well known in the art. It should also be understood that "server system" and "server" are often used interchangeably herein. Similarly, the database objects described herein can be implemented as single databases, a distributed database, a collection of distributed databases, a database with redundant online or offline backups or other redundancies, etc., and might include a distributed database or storage network and associated processing intelligence.

FIG. 1B shows a block diagram of an example of some implementations of elements of FIG. 1A and various possible interconnections between these elements. That is, FIG. 1B also illustrates environment 10. However, in FIG. 1B elements of system 16 and various interconnections in some implementations are further illustrated. FIG. 1B shows that user system 13A may include processor system 12A, memory system 12B, input system 12C, and output system 12D. FIG. 1B shows network 14 and system 16. FIG. 1B also shows that system 16 may include tenant data storage 22, tenant data 23, system data storage 24, system data 25, User Interface (UI) 30, Application Program Interface (API) 32, PL/SOQL 34, save routines 36, application setup mechanism 38, applications servers 100₁-100N, system process space 102, tenant process spaces 104, tenant management process space 110, tenant storage space 112, user storage 114, and application metadata 116. In other implementations, environment 10 may not have the same elements as those listed above and/or may have other elements instead of, or in addition to, those listed above.

User system 13A, network 14, system 16, tenant data storage 22, and system data storage 24 were discussed above in FIG. 1A. Regarding user system 13A, processor system 12A may be any combination of one or more processors. Memory system 12B may be any combination of one or more memory devices, short term, and/or long term memory. Input system 12C may be any combination of input devices, such as one or more keyboards, mice, trackballs, scanners, cameras, and/or interfaces to networks. Output system 12D may be any combination of output devices, such as one or more monitors, printers, and/or interfaces to networks. As shown by FIG. 1B, system 16 may include a network interface 20 (of FIG. 1A) implemented as a set of HTTP application servers 100, an application platform 18, tenant data storage 22, and system data storage 24. Also shown is system process space 102, including individual tenant process spaces 104 and a tenant management process space 110. Each application server 100 may be configured to communicate with tenant data storage 22 and the tenant data 23 therein, and system data storage 24 and the system data 25 therein to serve requests of user system 13A. The tenant data 23 might be divided into individual tenant storage spaces 112, which can be either a physical arrangement and/or a logical arrangement of data. Within each tenant storage space 112, user storage 114 and application metadata 116 might be similarly allocated for each user. For example, a copy of a user's most recently used (MRU) items might be stored to user storage 114. Similarly, a copy of MRU items for an entire organization that is a tenant might be stored to tenant storage space 112. A UI 30 provides a user interface and an API 32 provides an application programmer interface to system 16 resident processes to users and/or developers at user systems 13A-13N. The tenant data and the system data may be stored in various databases, such as one or more Oracle® databases.

Application platform 18 includes an application setup mechanism 38 that supports application developers' creation and management of applications, which may be saved as metadata into tenant data storage 22 by save routines 36 for execution by subscribers as one or more tenant process spaces 104 managed by tenant management process 110 for example. Invocations to such applications may be coded using PL/SOQL 34 that provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes, which manage retrieving application metadata 116 for the subscriber making the invocation and executing the metadata as an application in a virtual machine.

Each application server 100 may be communicably coupled to database systems, e.g., having access to system data 25 and tenant data 23, via a different network connection. For example, one application server 100₁ might be coupled via the network 14 (e.g., the Internet), another application server 100N-1 might be coupled via a direct network link, and another application server 100N might be coupled by yet a different network connection. Transfer Control Protocol and Internet Protocol (TCP/IP) are typical protocols for communicating between application servers 100 and the database system. However, it will be apparent to one skilled in the art that other transport protocols may be used to optimize the system depending on the network interconnect used.

In certain implementations, each application server 100 is configured to handle requests for any user associated with any organization that is a tenant. Because it is desirable to be able to add and remove application servers from the server pool at any time for any reason, there is preferably no server affinity for a user and/or organization to a specific application server 100. In one implementation, therefore, an interface system implementing a load balancing function (e.g., an F5 Big-IP load balancer) is communicably coupled between the application servers 100 and the user systems 13A-13N to distribute requests to the application servers 100. In one implementation, the load balancer uses a least connections algorithm to route user requests to the application servers 100. Other examples of load balancing algorithms, such as round robin and observed response time, also can be used. For example, in certain implementations, three consecutive requests from the same user could hit three different application servers 100, and three requests from different users could hit the same application server 100. In this manner, by way of example, system 16 is multi-tenant, wherein system 16 handles storage of, and access to, different objects, data and applications across disparate users and organizations.

As an example of storage, one tenant might be a company that employs a sales force where each salesperson uses system 16 to manage their sales process. Thus, a user might maintain contact data, leads data, customer follow-up data, performance data, goals and progress data, etc., all applicable to that user's personal sales process (e.g., in tenant data storage 22). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 16 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 16 might also maintain system level data usable by multiple tenants or other data. Such system level data might include industry reports, news, postings, and the like that are sharable among tenants.

In certain implementations, user systems 13A-13N (which may be client systems) communicate with application servers 100 to request and update system-level and tenant-level data from system 16 that may involve sending one or more queries to tenant data storage 22 and/or system data storage 24. System 16 (e.g., an application server 100 in system 16) automatically generates one or more SQL statements (e.g., one or more SQL queries) that are designed to access the desired information. System data storage 24 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for case, account, contact, lead, and opportunity data objects, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In certain implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 2A:
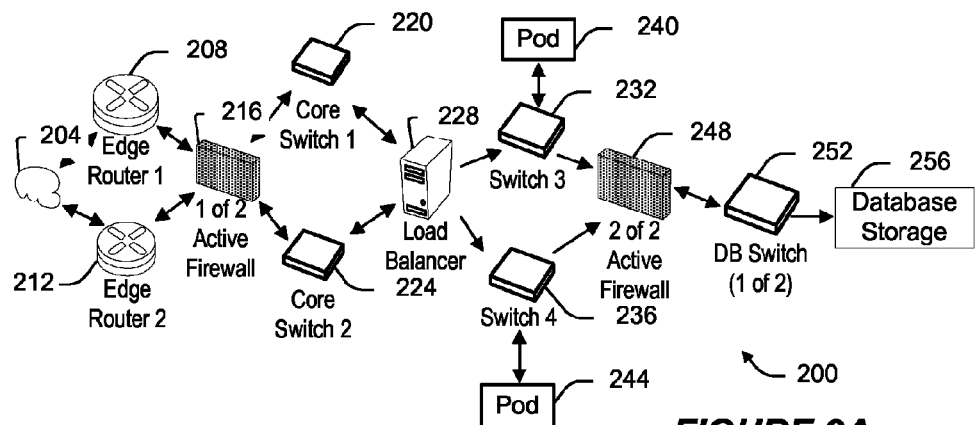
FIG. 2A shows a system diagram illustrating an example of architectural components of an on-demand database service environment 200 according to some implementations.

FIG. 2A shows a system diagram illustrating an example of architectural components of an on-demand database service environment 200 according to some implementations. A client machine located in the cloud 204, generally referring to one or more networks in combination, as described herein, may communicate with the on-demand database service environment via one or more edge routers 208 and 212. A client machine can be any of the examples of user systems 13A-13N described above. The edge routers may communicate with one or more core switches 220 and 224 via firewall 216. The core switches may communicate with a load balancer 228, which may distribute server load over different pods, such as the pods 240 and 244. The pods 240 and 244, which may each include one or more servers and/or other computing resources, may perform data processing and other operations used to provide on-demand services. Communication with the pods may be conducted via pod switches 232 and 236. Components of the on-demand database service environment may communicate with a database storage 256 via a database firewall 248 and a database switch 252.

Figure 2B:
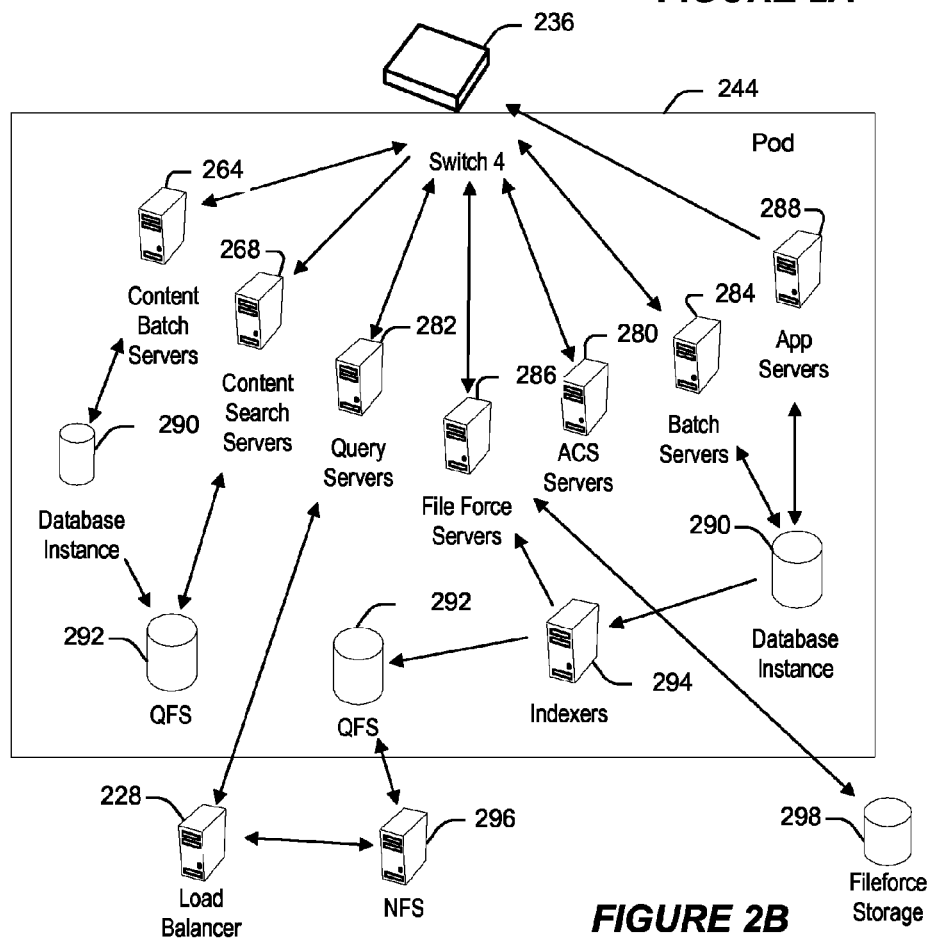
FIG. 2B shows a system diagram further illustrating an example of architectural components of an on-demand database service environment according to some implementations.

As shown in FIGS. 2A and 2B, accessing an on-demand database service environment may involve communications transmitted among a variety of different hardware and/or software components. Further, the on-demand database service environment 200 is a simplified representation of an actual on-demand database service environment. For example, while only one or two devices of each type are shown in FIGS. 2A and 2B, some implementations of an on-demand database service environment may include anywhere from one to many devices of each type. Also, the on-demand database service environment need not include each device shown in FIGS. 2A and 2B, or may include additional devices not shown in FIGS. 2A and 2B.

Moreover, one or more of the devices in the on-demand database service environment 200 may be implemented on the same physical device or on different hardware. Some devices may be implemented using hardware or a combination of hardware and software. Thus, terms such as "data processing apparatus," "machine," "server" and "device" as used herein are not limited to a single hardware device, but rather include any hardware and software configured to provide the described functionality.

The cloud 204 is intended to refer to a data network or plurality of data networks, often including the Internet. Client machines located in the cloud 204 may communicate with the on-demand database service environment to access services provided by the on-demand database service environment. For example, client machines may access the on-demand database service environment to retrieve, store, edit, and/or process information.

In some implementations, the edge routers 208 and 212 route packets between the cloud 204 and other components of the on-demand database service environment 200. The edge routers 208 and 212 may employ the Border Gateway Protocol (BGP). The BGP is the core routing protocol of the Internet. The edge routers 208 and 212 may maintain a table of IP networks or 'prefixes', which designate network reachability among autonomous systems on the Internet.

In one or more implementations, the firewall 216 may protect the inner components of the on-demand database service environment 200 from Internet traffic. The firewall 216 may block, permit, or deny access to the inner components of the on-demand database service environment 200 based upon a set of rules and other criteria. The firewall 216 may act as one or more of a packet filter, an application gateway, a stateful filter, a proxy server, or any other type of firewall.

In some implementations, the core switches 220 and 224 are high-capacity switches that transfer packets within the on-demand database service environment 200. The core switches 220 and 224 may be configured as network bridges that quickly route data between different components within the on-demand database service environment. In some implementations, the use of two or more core switches 220 and 224 may provide redundancy and/or reduced latency.

In some implementations, the pods 240 and 244 may perform the core data processing and service functions provided by the on-demand database service environment. Each pod may include various types of hardware and/or software computing resources. An example of the pod architecture is discussed in greater detail with reference to FIG. 2B.

In some implementations, communication between the pods 240 and 244 may be conducted via the pod switches 232 and 236. The pod switches 232 and 236 may facilitate communication between the pods 240 and 244 and client machines located in the cloud 204, for example via core switches 220 and 224. Also, the pod switches 232 and 236 may facilitate communication between the pods 240 and 244 and the database storage 256.

In some implementations, the load balancer 228 may distribute workload between the pods 240 and 244. Balancing the on-demand service requests between the pods may assist in improving the use of resources, increasing throughput, reducing response times, and/or reducing overhead. The load balancer 228 may include multilayer switches to analyze and forward traffic.

In some implementations, access to the database storage 256 may be guarded by a database firewall 248. The database firewall 248 may act as a computer application firewall operating at the database application layer of a protocol stack. The database firewall 248 may protect the database storage 256 from application attacks such as structure query language (SQL) injection, database rootkits, and unauthorized information disclosure.

In some implementations, the database firewall 248 may include a host using one or more forms of reverse proxy services to proxy traffic before passing it to a gateway router. The database firewall 248 may inspect the contents of database traffic and block certain content or database requests. The database firewall 248 may work on the SQL application level atop the TCP/IP stack, managing applications' connection to the database or SQL management interfaces as well as intercepting and enforcing packets traveling to or from a database network or application interface.

In some implementations, communication with the database storage 256 may be conducted via the database switch 252. The multi-tenant database storage 256 may include more than one hardware and/or software components for handling database queries. Accordingly, the database switch 252 may direct database queries transmitted by other components of the on-demand database service environment (e.g., the pods 240 and 244) to the correct components within the database storage 256.

In some implementations, the database storage 256 is an on-demand database system shared by many different organizations. The on-demand database system may employ a multi-tenant approach, a virtualized approach, or any other type of database approach. An on-demand database system is discussed in greater detail with reference to FIGS. 1A and 1B.

FIG. 2B shows a system diagram further illustrating an example of architectural components of an on-demand database service environment according to some implementations. The pod 244 may be used to render services to a user of the on-demand database service environment 200. In some implementations, each pod may include a variety of servers and/or other systems. The pod 244 includes one or more content batch servers 264, content search servers 268, query servers 282, file force servers 286, access control system (ACS) servers 280, batch servers 284, and app servers 288. Also, the pod 244 includes database instances 290, quick file systems (QFS) 292, and indexers 294. In one or more implementations, some or all communication between the servers in the pod 244 may be transmitted via the switch 236.

In some implementations, the app servers 288 may include a hardware and/or software framework dedicated to the execution of procedures (e.g., programs, routines, scripts) for supporting the construction of applications provided by the on-demand database service environment 200 via the pod 244. In some implementations, the hardware and/or software framework of an app server 288 is configured to execute operations of the services described herein, including performance of the blocks of methods described with reference to FIGS. 3-13. In alternative implementations, two or more app servers 288 may be included and cooperate to perform such methods, or one or more other servers described herein can be configured to perform the disclosed methods.

The content batch servers 264 may handle requests internal to the pod. These requests may be long-running and/or not tied to a particular customer. For example, the content batch servers 264 may handle requests related to log mining, cleanup work, and maintenance tasks.

The content search servers 268 may provide query and indexer functions. For example, the functions provided by the content search servers 268 may allow users to search through content stored in the on-demand database service environment.

The file force servers 286 may manage requests for information stored in the Fileforce storage 298. The Fileforce storage 298 may store information such as documents, images, and basic large objects (BLOBs). By managing requests for information using the file force servers 286, the image footprint on the database may be reduced.

The query servers 282 may be used to retrieve information from one or more file systems. For example, the query system 282 may receive requests for information from the app servers 288 and then transmit information queries to the NFS 296 located outside the pod.

The pod 244 may share a database instance 290 configured as a multi-tenant environment in which different organizations share access to the same database. Additionally, services rendered by the pod 244 may call upon various hardware and/or software resources. In some implementations, the ACS servers 280 may control access to data, hardware resources, or software resources.

In some implementations, the batch servers 284 may process batch jobs, which are used to run tasks at specified times. Thus, the batch servers 284 may transmit instructions to other servers, such as the app servers 288, to trigger the batch jobs.

In some implementations, the QFS 292 may be an open source file system available from Sun Microsystems® of Santa Clara, Calif. The QFS may serve as a rapid-access file system for storing and accessing information available within the pod 244. The QFS 292 may support some volume management capabilities, allowing many disks to be grouped together into a file system. File system metadata can be kept on a separate set of disks, which may be useful for streaming applications where long disk seeks cannot be tolerated. Thus, the QFS system may communicate with one or more content search servers 268 and/or indexers 294 to identify, retrieve, move, and/or update data stored in the network file systems 296 and/or other storage systems.

In some implementations, one or more query servers 282 may communicate with the NFS 296 to retrieve and/or update information stored outside of the pod 244. The NFS 296 may allow servers located in the pod 244 to access information to access files over a network in a manner similar to how local storage is accessed.

In some implementations, queries from the query servers 222 may be transmitted to the NFS 296 via the load balancer 228, which may distribute resource requests over various resources available in the on-demand database service environment. The NFS 296 may also communicate with the QFS 292 to update the information stored on the NFS 296 and/or to provide information to the QFS 292 for use by servers located within the pod 244.

In some implementations, the pod may include one or more database instances 290. The database instance 290 may transmit information to the QFS 292. When information is transmitted to the QFS, it may be available for use by servers within the pod 244 without using an additional database call.

In some implementations, database information may be transmitted to the indexer 294. Indexer 294 may provide an index of information available in the database 290 and/or QFS 292. The index information may be provided to file force servers 286 and/or the QFS 292.

Figure 3:
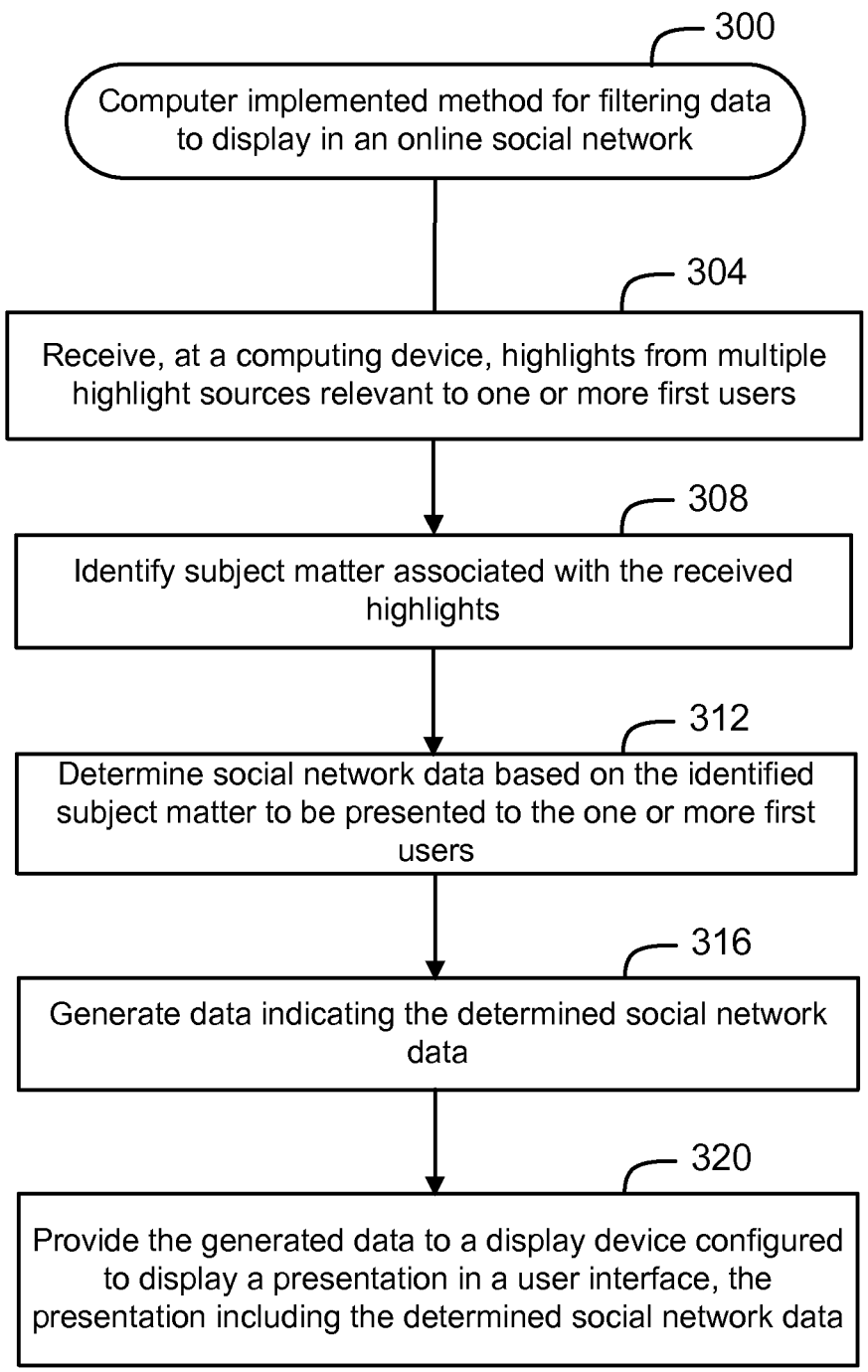
FIG. 3 shows a flowchart of an example of a computer implemented method 300 for filtering data to display in an online social network, performed in accordance with some implementations.

FIG. 3 shows a flowchart of an example of a computer implemented method 300 for filtering data to display in an online social network, performed in accordance with some implementations. At block 304, highlights from multiple highlight sources relevant to one or more first users are received at a computing device or any number of computing devices cooperating to perform method 300. Highlights can include information updates or other content posted or published to a social network. Examples include conversations, posts, comments, updates to a user's status, updates to a record, uploaded files, and hyperlinks to social network data or other network data such as various documents and/or web pages on the Internet. Highlight sources can include one or more collections of users, entities, and/or topics that are relevant to the one or more first users. One example of a highlight source for a user John D. is his "inner circle," the users and/or other entities with whom he interacts most in the online social network. Inner circle highlights may include content posted to the social network from these users and other entities. Another example of a highlight source is "global influence," the users and/or other entities that exert the most influence on the social network. Global influence highlights can include content posted to the social network from these users and other entities. These and other examples of highlight sources are described further with reference to FIG. 4, below. Examples of methods for providing highlights from a highlight source are also described below with reference to FIG. 4.

At block 304, a server can retrieve the highlights from any of a variety of storage mediums as disclosed herein, by way of example. For instance, tenant data storage 22 and/or system data storage 24 of FIGS. 1A and 1B can store the information updates and other social network data that may be retrieved in block 304. One or more servers can be configured to process data to perform part or all of block 304, as well as part or all of the remaining blocks of method 300. In an alternative example, a user system 13A as mentioned above can be configured to perform part or all of the blocks of method 300. Any of the various databases and/or memory devices described herein can serve as storage media to store and maintain information updates and other social network data for retrieval at block 304.

A highlight source can be generated or selected by a user or system-generated, as described in the examples below, and stored and maintained in the social networking system in which method 300 is practiced. In some implementations, when a highlight source is used in conjunction with the identity of a first user, the highlight source can be stored in association with the first user. In some implementations, the highlight source can be stored in association with the user profile of the first user. For instance, a database table can store users and other entities of the first user's inner circle in rows with a column identifying the first user and/or the first user's profile with which the entities are linked. Information updates that are associated with the inner circle entities can be linked to the first user by cross-referenced tables such as one or more of the tables of FIG. 9A. According to various implementations, all or only a subset of the content posted by a user of other entity of a particular highlight source can be received at block 304. For example, only information updates of a certain type (e.g., posts) or from a certain time period (e.g., information updates from the last week or last hour) may be received.

In FIG. 3, at block 308, subject matter associated with the received highlights is identified. In some implementations, the one or more computing devices performing method 300 can cause the received highlights to be analyzed to identify subject matter associated with the highlights. Examples of subject matter associated with highlights can include the name of a user, a group, an account, a record, or some category of information. A category of information may indicate subject matter related to a product or a service, technology, software, music, movies, books, travel, or any other subject matter. As discussed further below, in some implementations, the subject matter includes topics in the online social network.

In some implementations, one or more servers configured to perform method 300 may be configured to identify subject matter associated with an information update using the content of the information update or cause the subject matter to be identified. For example, a designated character, word, phrase, symbol, expression (e.g., an emoticon), command, @mention, user ID and/or hash tag can be identified in the update. The designated information may be selected by a user or may be system-generated. In some implementations, subject matter may be identified based on a URL address, a hyperlink, a language, a header, a document, an image file, a video file, and/or an audio file associated with an information update or an entity. For example, subject matter may be identified based on the content of a conversation thread including a post and a string of comments in an information feed of the online social network. The systems described herein may determine subject matter based on the frequency or occurrence of keywords, phrases, symbols, etc. within a conversation thread.

In some implementations, block 308 may involve identifying topics associated with the received highlights. In some implementations, the associated topics may be retrieved from a storage media of the online social network. In some implementations, the one or more computing devices configured to perform method 300 can be configured to analyze the highlights or cause the highlights to be analyzed to identify one or more topics. For example, a post or conversational thread may be associated with the topic "solar panel design". Management of topics in an online social network is discussed further below with respect to FIG. 7.

In FIG. 3, at block 312, social network data associated with the subject matter to be presented to the first user is determined. In some implementations, social network data that can be identified include data objects in the form of records such as cases, accounts, or opportunities, individual users and groups of users, and topics. In some implementations, the social network data that can be identified includes one or more posts, messages, conversations, entities, records, uploaded files, products, advertisements, and multimedia data in the online social network. In some implementations, the determined social network data includes highlights received in block 304. For example, in some implementations, the system may identify a subset of the most relevant highlights received in block 304 in block 312. In some implementations, the determined social network data can include social network data in addition to or instead of social network data received in block 304. For example, in some implementations, one or more persons, topics, objects, or records that may be relevant to the first user may be identified. In a particular example, a contact at ABC Company may be identified to a user George W. as potentially relevant. In other example, a topic "e-commerce in Asia" may be identified as a topic that may be relevant to George W., for example, based on highlights from his inner circle, topical highlights, global influence highlights, or a combination thereof. In some implementations, determining social network data to be presented to the first user based on the identified subject matter includes identifying social network data associated with topics that correspond to the identified subject matter. For example, if the topic "emerging markets" is identified, a recommendation to follow a user Al Gore may be presented to the first user based on Al Gore's being a top influencer of the topic.

Data can then be generated at block 316 indicating the determined social network data. In some instances, the generated data can include a reference to one or more subject matter and/or highlight sources from which the determined social network data was derived in blocks 304-312. Data indicating the determined social network data can be provided at block 320 to a display device configured to display a presentation in a user interface. In some implementations, the determined social network data may be part of a feed in the user interface. As described in further detail in the examples below, in some implementations, such a presentation will include a reference to associated subject matter or highlight sources. In one example, a presentation may indicate that a highlight source (e.g., the first user's inner circle) is talking about a particular topic (e.g., XYZ Company). In some implementations, a presentation may include a recommendation for first user to follow or otherwise access the determined social network data.

In FIG. 3, at block 320, the display device can be a display of a user system 13A as described above with reference to FIGS. 1A and 1B. The display device of block 320 can be configured to concurrently display other components in a suitable user interface, including feeds, lists of users, and relevant data regarding a user's profile, a record, or other construct in the online social network.

In FIG. 3, in one example, an app server 288 in the on-demand service environment 200 of FIGS. 2A and 2B includes one or more processors configured to perform part or all of blocks 304-320. In other instances, one or more other computing devices such as user systems 13A-13N and/or other servers retrieve, process, and exchange data to cooperate with app server 288 to perform the blocks. When user input data, for example, is used in block 304 and/or block 312, such data can be received by a server over a data network from a user operating a user system 13A as shown in FIGS. 1A and 1B. In other instances, such data is received from a proxy server on behalf of a user or other data source. Various implementations of method 300 are possible, such that any of the servers described above with reference to FIG. 2B or other computing devices disclosed herein can be configured to receive and process parameters and information updates in accordance with method 300.

Returning to block 320, in one example, the data provided to the display device is transmitted from a server such as app server 288 over network 14 to a user system 13A of FIGS. 1A and 1B. In this example, the display device is one component of the user system 13A, which includes a processor configured to execute a web browser program stored on user system 13A to output a graphical presentation of the data on the display device, for instance, in a GUI. In other examples, the data provided to the display device at block 320 is generated locally at user system 13A. By the same token, one or more of the blocks 304-320 as described above can also be performed at user system 13A as an alternative to being performed at one or more servers in an online social network. The same is true for the other examples of methods described below.

Figure 4:
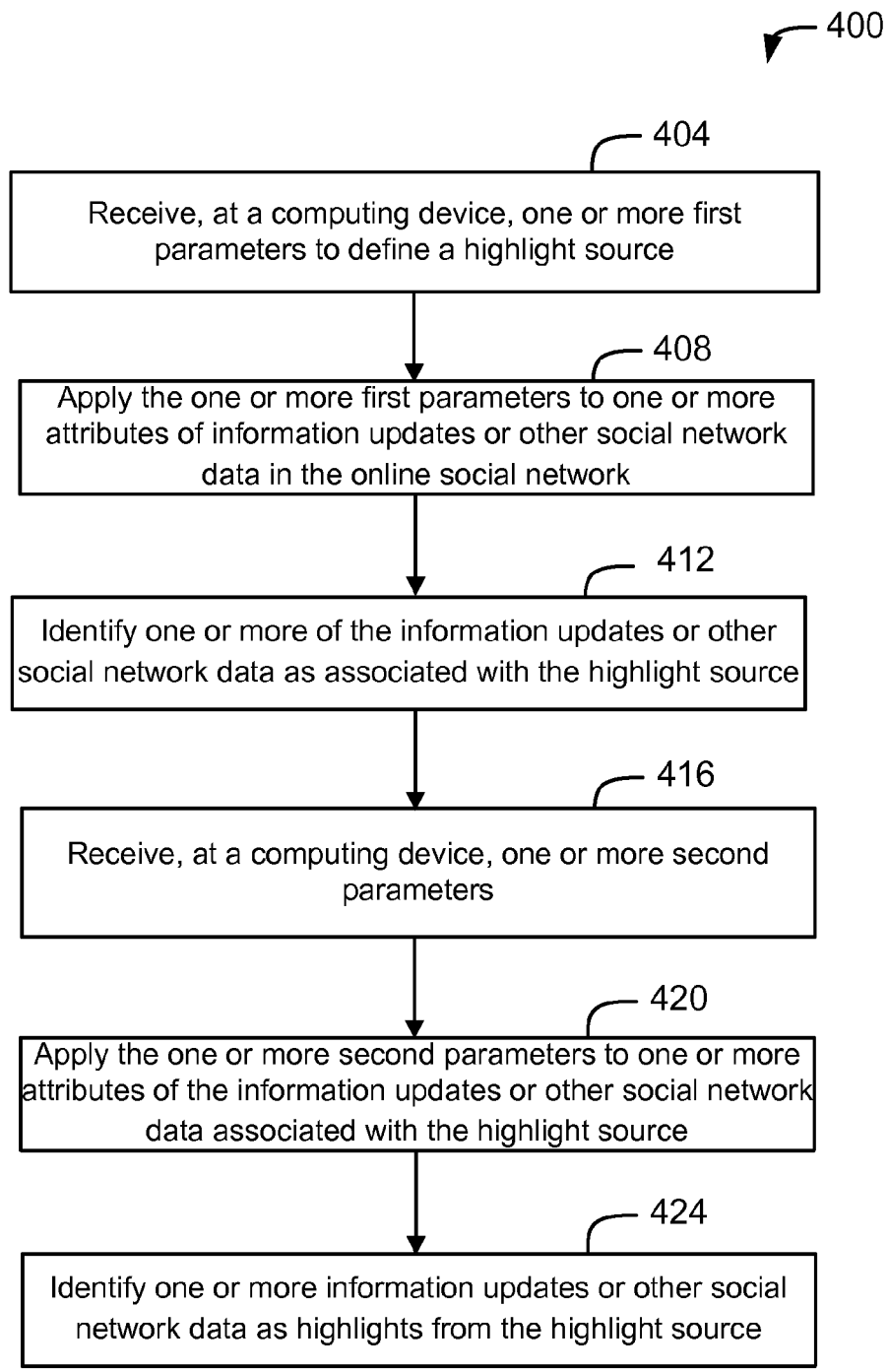
FIG. 4 shows a flowchart of an example of a computer implemented method 400 for defining a highlight source and identifying highlights of the highlight source, performed in accordance with some implementations.

FIG. 4 shows a flowchart of an example of a computer implemented method 400 for defining a highlight source and identifying highlights of the highlight source, performed in accordance with some implementations. Method 400 can be performed, for example, prior to or as part of block 304 of method 300 described above with reference to FIG. 3. In FIG. 4, at block 404, a computing device performing or any number of computing devices cooperating to perform method 400 receives one or more first parameters to define a highlight source.

For example, a parameter can identify a user, a group, a role, a title, a group, a record, a field of a record, a type of record, a geographic location, and a keyword. A number of other examples of parameters and combinations of parameters can be selected and customized according to the particular implementation as illustrated in the various examples described below.

In some implementations, a highlight source for a first user can be defined in whole or part based on a level of interaction with the first user. For example, in some implementations, a highlight source can be a user's inner circle. An inner circle can be defined as one or more entities with whom a user interacts most. According to various implementations, an inner circle may include one or more of: other users in the online social network, groups of users in the online social network, data objects such as records (e.g., cases, accounts, or opportunities) in the online social network, and other entities having a presence on the online social network including non-human entities such as servers or devices. Non-limiting examples of entity types include users, groups, organizations, records, feeds and other social networking constructs. Another type of entity that can contribute to an inner circle highlight source is an application executing on one or more servers or other computing devices. For example, an application hosted on a cloud application platform such as Heroku® can be in the inner circle of a user. In some implementations, an inner circle may be limited by entity type. For example, an inner circle may include only others users and/or other groups of users, only data objects such as records, only non-human entities, etc. In some other implementations, an inner circle may include a combination of these.

According to various implementations, contributing entities to an inner circle can selected by a user, can be system-generated or selected using any of the various available social network data stored and maintained in the social networking system in which method 400 is practiced. For example, an inner circle of a user may be identified manually by the user, by monitoring the user's activity on the online social network, or a combination of these. Factors that can be considered in defining an inner circle of a first user can include whether the first user follows the user, record, or other entity, the number of times the first user interacts with the user, record, or other entity, e.g., via message, post, comment, conversation, etc., the number of times the first user posts information about the user, record, or other entity, and the number of times the user accesses the user, record, or other entity or information about the user, record, or other entity (e.g., such as a user profile). In some implementations, multiple inner circle highlight sources may be identified for a first user. For example, a user-only inner circle and a record-only inner circle may be identified. Similarly, multiple inner circle highlight sources may be identified based on different levels of interaction by the first user.

In some implementations, the parameters defining a highlight source may be retrieved from one or more suitable storage media of the online social network. FIG. 5 shows an example of an inner circle table 500 that may be used in tracking an inner circle of one or more users. Inner circle table 500 includes columns of user ID 501, inner circle object IDs 503, and inner circle user IDs 505. In the example of FIG. 5, an inner circle of the user with the user ID U919 includes objects with object IDs O615, O712, O987, etc. and users with user IDs U921, U981, U100, etc. Inner circle table 500 may be arranged in any appropriate manner; for example, each inner circle object ID or user ID may occupy an individual row in some implementations. The inner circle table 500 can be updated periodically as the user's interactions change. In some implementations, the parameters defining a highlight source may be retrieved from one or more tables in the online social network. For example, in implementations in which objects of a first user's inner circle include or are defined by objects to which the first user subscribes, block 404 can involve retrieving parameters such as object ID's from a user subscription table.

Another example of a highlight source is an influence highlight source. Influence considers users, data objects, and other entities that have influence on the online social network. One example of an influence highlight source is a global influence highlight source. Global influence considers those entities that exert the most influence on the online social network. Another example of an influence highlight source is a topical influence highlight source. Topical influence considers those entities that exert influence of a topic or otherwise demonstrate knowledge on a topic in the online social network.

Contributing entities to an influence highlight source can be system-generated or selected using any of the various available social network data stored and maintained in the social networking system. For example, in some implementations, a user may designate one or more entities as being influential. In some implementations, an entity is determined to be an influencer based on one or more factors. For example, the one or more factors can indicate the extent of dissemination of information contributed by the entity to other entities in the online social network. The one or more factors can be selected by a user, can be system-generated or selected using any of the various available social network data stored and maintained in the social networking system in which methods 300 and 400 are practiced.

Figure 6A:
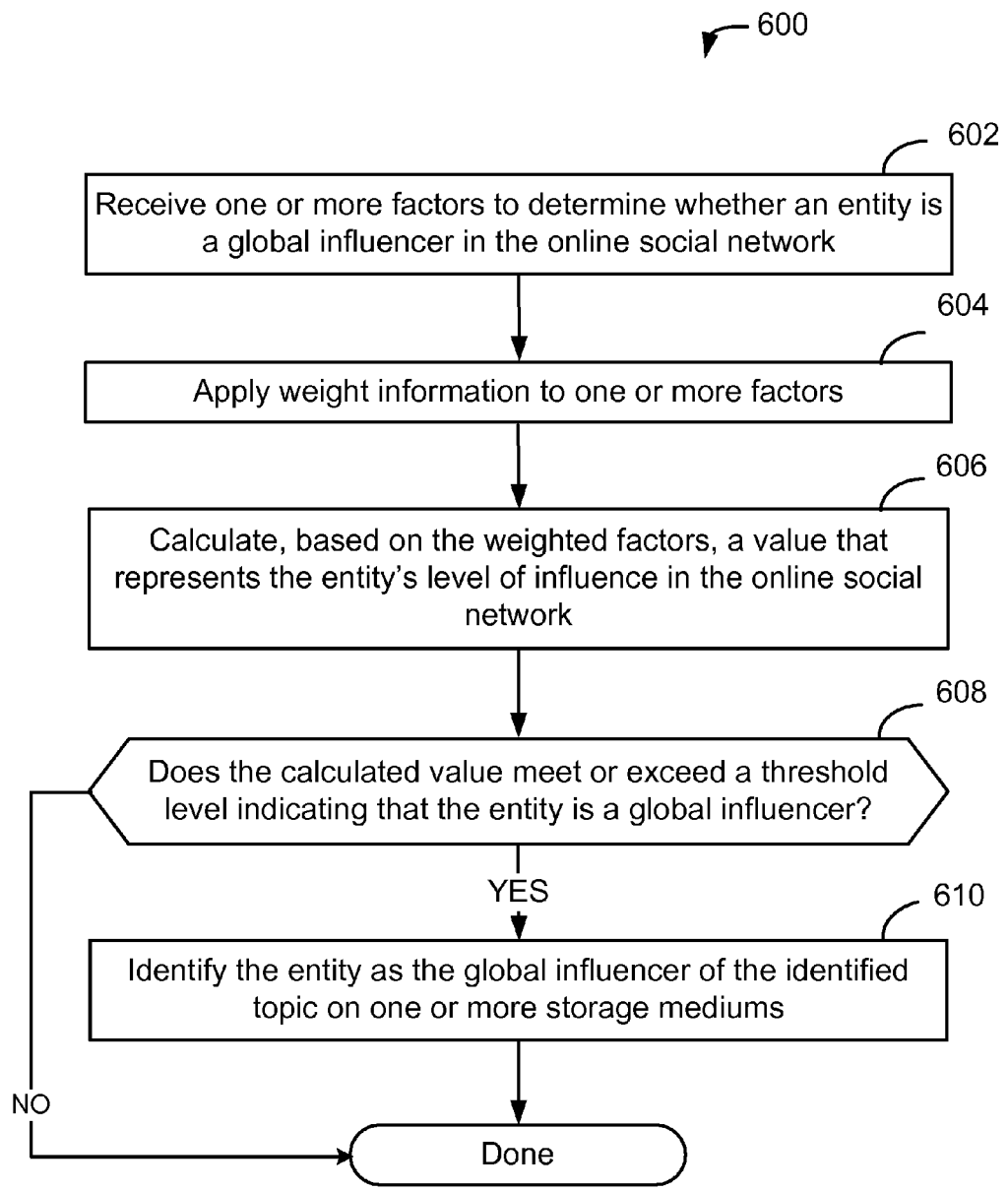
FIG. 6A shows a flowchart of an example of a computer implemented method 600 for determining whether an entity is a global influencer in an online social network based on one or more factors, performed in accordance with some implementations.

FIG. 6A shows a flowchart of an example of a computer implemented method 600 for determining whether an entity is a global influencer in an online social network based on one or more factors, performed in accordance with some implementations. At block 602, one or more factors are used to determine whether an entity is a global influencer in the online social network. For example, the one or more factors can be used as indicators of an entity's contributions of content to an online social network and the breadth of dissemination of the entity's contributions to other entities in the online social network. Any one or more factors, including combinations of selected factors in block 602 can be applied to determine whether an entity is an influencer in the online social network.

Examples of factors used to determine where an entity is a global influencer may include one or more of: a number of followers of the entity, the influence of followers of the entity (e.g., whether the entity is followed by other influencers), a number of preference indications associated with feed items associated with the entity (e.g., posts by the entity that are "liked"), a number of times a feed item is shared within the online social network, a number of comments feed items associated with the entity receive, a number of times the entity is @mentioned in messages or feed items submitted by one or more users of the online social network, a number of endorsements the entity has received, a number of times the entity has been recognized as an expert or an authority by one or more users of the online social network, and a number of user-submitted messages having content identifying the entity. For example, the number of times posts from a user, Amanda K., are shared in the online social network, such as re-tweets in Twitter®, re-shares in Google+®, shares in Facebook®, etc. add to her influence factor as well as indicate her reach in engaging other users with her content.

At block 604, weight information is applied to one or more factors. In some implementations, numerical weights can be applied to any one or more of the various factors based on the importance of the factor. For example, "likes" for a post may be weighted less than a comment to a post because there is more effort required in submitting a comment. In some instances, the weight may depend on how an entity engages other entities in an online social network. For example, if a feed item submitted by a user is shared over one hundred times in an online social network, this reaction may increase the user's influence value. In contrast, if a user posts one hundred feed items resulting in only 10 shares of a feed item, this reaction may be weighted less. In another example, if a user receives likes, comments, and shares of his post from one hundred different people instead of one hundred messages from one person, then this may be weighted more heavily in calculating an entity's level of influence.

At block 606, a value that represents the entity's level of influence is calculated based on the weight information that was applied in block 604. In some implementations, the weighted values of each factor may be summed to calculate the entity's level of influence. In some implementations, a custom algorithm may be executed to calculate the entity's level of influence. For example, the algorithm may calculate the number of messages (posts, comments, likes, private messages, shares) generated by a user, Jackie Chang. Then, a summation of user reactions to Jackie's messages is calculated. The user reactions include posts, comments, likes and shares generated by other users in response to Jackie's messages. In this example, the summation is calculated as follows: (2×number of comments)+(3×number of posts)+(number of likes)+(5×shares). Then, Jackie's level of global influence is the ratio of the number of messages generated by Jackie to the summation of user reactions. The same algorithm can be applied to calculate other entities' respective levels of influence.

At 608, it is determined whether the calculated value meets or exceeds a threshold level that indicates that the entity is a global influencer in the online social network. In some implementations, the threshold value may designate different influence ranges. For example, a value calculated at block 606 that falls within the 0-30 range may be identified as an observer. If the value is within 31-69, then the entity is an active influencer. Otherwise, the entity is a top influencer. In this example, an entity may be identified as an observer if the entity's contributions provoke little or no engagement with other entities. In contrast, an active influencer or a top influencer is an entity that actively contributes information and content in the online social network (e.g., by creating comments, posts, and other messages) that cause other users to react and perform actions ("like", comment, share, @mention the influencer) in response those messages.

In some implementations, at block 608, if it is determined that the entity is not an influencer, method 600 ends. Alternatively, if it is determined that the entity is an influencer, appropriate data is stored in one or more storage mediums at block 610. For example, the influence value of block 606 may be stored in a database table in connection with a user ID, and the influence value may be periodically updated as new user interactions are detected. This way, a running influence value may be maintained for a user, and when the value meets or exceeds the threshold level, the user may be identified as a contributor to a global influencer highlight source. FIG. 5 shows an example of a global influence table 510 that may be used in tracking global influencers. Global influence table 500 includes columns of user ID 511 and global influence value 513. Values shown in FIG. 5 may be internally stored values of influence scores, though final influence values shown to users may be expressed in a different scale (e.g., 0-100). Returning to FIG. 4, in some implementations, the parameters defining a highlight source in block 404 can include a threshold global influence value.

Figure 6B:
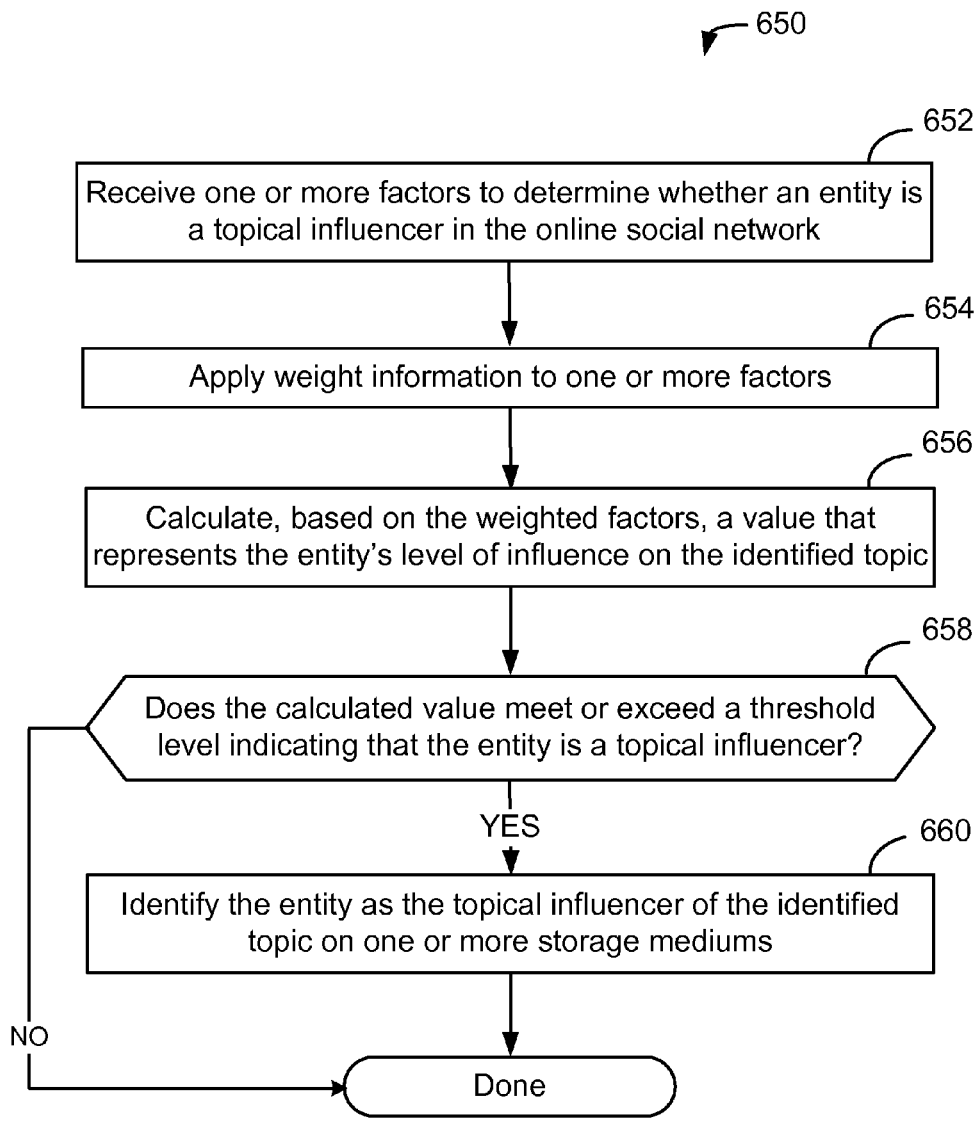
FIG. 6B shows a flowchart of an example of a computer implemented method 650 for determining whether an entity is a topical influencer of an identified topic based on one or more factors, performed in accordance with some implementations.

FIG. 6B shows a flowchart of an example of a computer implemented method 650 for determining whether an entity is a topical influencer of an identified topic based on one or more factors, performed in accordance with some implementations. The one or more factors are used as indicators of an entity's contributions of content to a topic and the breadth of dissemination of these contributions to other entities in an online social network. Any one or more factors, including combinations of selected factors in block 652 can be applied to determine whether an entity is a topical influencer of an identified topic. The influencer may also be referred to as knowledgeable on topic.

In some implementations, some of the factors are based on how an entity's contribution to a topic impacts other online social network users, groups, organizations, and other entities. For instance, some of the factors measure whether an entity's post on a topic causes other entities to react or perform an action. For example, a user, Dr. Sanjay Gupta, posts a feed item about treatment of blood clots in the human body. In this example, the number of preference indications, such as "likes," "+1", emoticons (☺), ☹), and comments received in response to Dr. Sanjay Gupta's post may be used as factors to determine Gupta's influence on blood clots. Additionally, the number of times Dr. Sanjay Gupta's post is shared in the online social network, such as re-tweets in Twitter®, re-shares in Google+®, shares in Facebook®, etc. add to Dr. Sanjay Gupta's influence factor as well as indicate Dr. Sanjay Gupta's reach in engaging other users with his content.

In some implementations, some of the factors are based on the influence of the topic in an online social network. For example, a number of times a topic is discussed by other users in an online social network, or a number of users discussing blood clots, can be a factor. Additionally, the factors could include the number of followers of a topic profile page. In this example, if a topic has a high number of followers, then the topic may be considered influential because a lot of users, groups, and other entities are interested in the topic.

In some implementations, some of the factors relate to an entity contributing information to a topic. For instance, the number of times a topic is included in a message submitted by a user, the number of times the user accesses a topic feed, or the number of times comments and posts include content about a topic may be a factor to determine a user's topical influence. In some instances, the factors may also include the number of times the entity has been recognized as an expert or authority regarding the topic. For example, users, groups and organizations may endorse Dr. Sanjay Gupta as an expert on blood clots. In some other instances, a number of times user-submitted messages that include content identifying an entity and a topic may be used. In yet some other instances, the factors may include a number of times an entity is @mentioned in messages submitted by other users. In some instances, topical influence may be based on an association of an entity profile page with the topic. For example, a user may indicate some topics that are of interest and topics that he is following in his user profile information. This information can be used as a factor in determining topical influence.

At block 654, weight information is applied to one or more factors. As in the method 600, in some implementations, numerical weights can be applied to any one or more of the various factors based on the importance of the factor. In some implementations, the weight may depend on how an entity's contribution to a topic engages other entities in an online social network. For example, if a feed item submitted by a user is shared over one hundred times in an online social network, this reaction may increase the user's topical influence value. In contrast, if a user posts one hundred feed items resulting in only 10 shares of a feed item, this reaction may be weighted less. In another example, if a user receives likes, comments, and shares of his post from one hundred different people instead of one hundred messages from one person, then this may be weighted more heavily in calculating an entity's level of influence on a topic.

At block 656, a value that represents the entity's level of influence on the identified topic is calculated based on the weight information that was applied in block 654. The value can represent the entity's knowledge of the identified topic, which can come from a combination of derived data and endorsements. As in the method 600, in some implementations, the weighted values of each factor may be summed to calculate the entity's level of influence. In some implementations, a custom algorithm may be executed to calculate the entity's level of influence. For example, a user's level of topical influence may be or include the ratio of the number of messages generated by the user to the summation of user reactions.

At 658, it is determined whether the calculated value meets or exceeds a threshold level that indicates that the entity is a topical influencer. In some implementations, the threshold value may designate different topical influence ranges. For example, a value calculated at block 656 that falls within the 0-30 range may be identified as an observer. If the value is within 31-69, then the entity is an active influencer. Otherwise, the entity is a top influencer. In this example, an entity is identified as an observer if the entity occasionally posts messages and sporadically comments on, shares or "likes" messages about a topic. In contrast, an active influencer or a top influencer is an entity that actively contributes information and content about a topic by creating messages (e.g., comments, posts) that causes other users to react and perform actions ("like", comment, share, @mention the topical influencer) in response those messages.

In some implementations, at block 658, if it is determined that the entity is not a topical influencer, method 650 ends. Alternatively, if it is determined that the entity is a topical influencer, appropriate data is stored in one or more storage mediums at block 660. For example, the topical influence value of block 656 may be stored in a database table in connection with a user ID, and the topical influence value may be periodically updated as new user interactions with the identified topic are detected. This way, a running topical influence value may be maintained for a user, and when the value meets or exceeds the threshold level, the user may be identified as a contributor to a topical influencer highlight source. In some implementations, the entity identified in the database table may be one of many entities that are topical influencers on a corresponding topic. FIG. 5 shows an example of a topical influence table 520 that may be used in tracking topical influencers to define one or more topical influence highlight sources. Topical influence table 520 includes columns of topic ID 521, user ID 523 and topical influence value 525. In the example of FIG. 5, user U761 may be identified as an observer for topic T199 based on the topical influence value, user U777 may be identified as an active influencer of topic T199, and users U098 and U521 may be identified as top influencers of topic T199. Values shown in FIG. 5 may be internally stored values of influence scores, though final influence values shown to users may be expressed in a different scale (e.g., 0-100). Returning to FIG. 4, in some implementations, the parameters defining a highlight source in block 404 can include a threshold topical influence value for a topic.

While the tables 510 and 520 in the example of FIG. 5 show users as possible contributing entities to a highlight source, non-limiting examples of entity types that may contribute to an influence highlight source include users, groups, organizations, records, feeds and other social networking constructs. For example, in some implementations, an influence highlight source may consider only certain types of entities. Further, in some implementations, an influence among a sub-set of an online social network may be considered. For example, an influence highlight source may consider only those users and/or other entities that exert the most influence among users and other entities in a particular geographic region (e.g., entities influential in Asia), among users having a particular seniority status or job title (e.g., entities influential with senior level executives or with salespeople), with a particular client, etc.

While an inner circle highlight source (or other highlight source based on an interaction level with a first user) may represent a collection of entities unique to a first user or group of first users, an influence highlight source may provide highlights across multiple users of an online social network. For example, a global influence highlight source that considers entities that exert influence across the online social network may provide highlights to all users on the online social network. In another example, an influence source that considers entities that exert influence in a certain geo-location may provide highlights to all users in that geo-location.

Another example of a highlight source is a topical highlight source. Topical highlights can consider topics relevant to a user. For example, in some implementations, a topical highlight source of a first user can consider information updates or other content in the online social network associated with a topic that the first user most commonly discusses in posted content. In some implementations, a topical highlight source can consider information updates or other content in the online social network associated with a topic that for which the user is an active or top influencer. According to various implementations, relevant topics to a first user can be system-generated or selected using any of the various available social network data stored and maintained in the social networking system. For example, a user can manually identify topics using a closed or open library of terms.

In some implementations, the system may consider topics associated with information updates or other content posted by a user or with which a user interacts most to identify relevant topics to the user or a group of users. FIG. 5 shows an example of a topical relevance table 530. In the example of FIG. 5, topical relevance table 530 includes columns of user ID 531 and topic ID 533. Topical relevance table 530 includes relevant topics T412, T212, and T909 for user U919. In some implementations, a topical relevance table 530 may include a topical relevance value indicating a degree of relevance to the user. Also in some implementations, the list of relevant topics to a user or a group of users can be updated periodically updated as new user interactions with topics are detected.

In some implementations, determining topics relevant to a user may include identifying topics associated with a user or other entity or a content posted by a user or other entity to the online social network. In some implementations, the identified topic may be the name of a user, a group, an account, a record, or some category of information. The category of information may indicate subject matter related to a product or a service, technology, software, music, movies, books, travel, or any other subject matter.

Relevance of a topic to a user can be based on one or more factors including how many posts, comments, or other content contributed by a user to the online social network is associated with the topic, the number of times the user includes keywords associated with the topic in his information updates or other feed items, the number of times the user has accessed or interacted with a topic profile page, the number of times the entity has been recognized as an expert or an authority regarding the topic, and the influence level of the user to the topic.

In some implementations, one or more servers may identify a topic associated with a feed item using the content of the feed item. For example, a designated character, word, phrase, symbol, expression (e.g., an emoticon), command, @mention, user ID and/or hash tag can be identified in the feed item. The designated information may be selected by a user or may be system-generated. In another example, a topic may be expressly identified in association with a feed item. Management of topics in an online social network is discussed further below with respect to FIG. 7.

Returning to FIG. 4, in some implementations, block 404 may include receiving topics relevant to a first user as parameters. In some implementations, block 404 may include identifying contributing entities to a topical highlight source as parameters. For example, in some implementations, contributing entities to a topical highlight source may include topical influencers of one or more topics that are most relevant to a user. In one example, a topic "blood clots" may be identified as being relevant to a user James V. based on one or more factors such as following a blood clots profile page, accessing a journal article associated with blood clots, and/or posting messages associated with the topic blood clots. In another example, as a topical influencer on blood clots, Dr. Sanjay Gupta, may be identified as a contributing entity to the topic blood clots.

Another example of a highlight source is a serendipity highlight source. Serendipity highlights can include topics, users, data objects, records, or other entities accessible through the social network feed that may be of interest to a user, but do not necessarily fall within any particular inner circle, influence, or common topic framework. Block 404 of FIG. 4 can include receiving parameters based in whole or in part on random (including pseudo-random) sampling of content in the online social network. For example, one or more topics, users, data objects, or records may be identified at least in part by random sampling as parameters.

In some implementations, block 404 may also involve receiving parameters based on one or more patterns in addition to or instead of random sampling to define a serendipity highlight source. For example, a system may consider a user's activity over time on the online social network, and may also consider other user's activities to identify a pattern. In one example, a server can be configured to perform analytics to identify and register various attributes of users based on their actions, personal profile information, and any input data such as messages received from them, and based on identified records and other objects acted upon by the users. As patterns are identified, such as the frequent and repeated mention of certain keywords among identifiable users, the server can be configured to automatically generate parameters specifying those keywords or other data representing the identified patterns. For example, if the system recognizes that a user is frequently in a particular geo-location (e.g., San Francisco), block 404 may include receiving one or more topics popular with other users in that geo-location or top influencers of users in that geo-location as parameters. In another example, the system may recognize that user is interested in mid-sized companies and block 404 may include receiving records related to similarly sized companies as parameters.

Further examples of highlight sources can include one or more transient highlight sources. A transient highlight source can include highlights relevant to a user based on one or more temporary or transient states of the user. Examples include one or more vital signs of the user (e.g., body temperature, pulse rate, heart rate, blood pressure, respiratory rate, or other physiological measurement), geo-location of the user (e.g., work, home, commute route, Shanghai, Market Street in San Francisco, etc.), and mood of the user (e.g., happy, content, angry, etc.). According to various implementations, a transient state may be automatically detected by the system, a user device and/or input by a user. For example, a system may determine a mood of a user based on one or more emoticons and/or indications of preference input by a user. In another example, a user device may be configured to measure the physiological statistics of the user such as pulse rate and/or eye movement. Block 404 of FIG. 4 may include receiving parameters in the online social network relevant to the user based on one the one or more transient states. For example, if vital signs indicate that a user is stressed out, the system may identify parameters such as key clients or accounts that the user follows as being relevant to the user at that time. In another example, if the geo-location identifies the user as being at home on a weekend, the system may identify recreational topics or groups (e.g., a work softball league) as being relevant to the user at that time.

In FIG. 4, at block 408, the one or more computing devices performing method 400 are configured to apply the parameter or parameters of block 404 to one or more attributes of information updates or other social network data in the online social network.

Parameters may be applied to social network data including information updates in a feed, topics, users, data objects, records, posts, messages, conversations, entities, records, uploaded files, products, advertisements, and multimedia data in the online social network. In some implementations, the social network data includes customer relationship management (CRM) data such as accounts, cases, contacts, leads, and opportunities. In some implementations, the social network data indicates a change in in a field, a status, or a type of a CRM object. In some implementations, the social network data indicates an event in the online social network or in a CRM system. For example, an event can include updating a file, updating a CRM object, updating a user profile, and a user action.

Examples of attributes at block 408 can include a user or other entity that publishes or is associated with the social network data and keywords (e.g., topics) associated with the social network data. For example, in the context of parameters of an inner circle highlight source applied to information updates, parameters can identify the users and other entities that are in a first user's inner circle, so that a subset of information updates in one or more feeds can be processed at block 408. Parameters can be applied to various data associated with the information updates, including the content of an information update as well as header data, attached files, and other data linked or referenced by the information update. For instance, when a parameter identifies a specific entity belonging to an inner circle of the first user, the author or sender of a particular information update can be an attribute at block 408. Similarly, for an influence highlight source, when a parameter identifies an entity as being an influencer (e.g., a global or topical influencer), the author or sender of a particular information update can be an attribute at block 408. For a topical highlight source, when a parameter identifies a topic relevant to a first user, one or more keywords or topics associated with a particular information update can be an attribute at block 408.

In FIG. 4, at block 412, any information updates or other social network data having one or more attributes satisfying the one or more parameters at block 408 are identified by the computing device or computing devices performing method 400 as being associated with the highlight source. Examples of data identified at block 412 can include information updates published by the first user's inner circle, information updates published by global influencers, information updates published by topical influencers of topics relevant to the first user, topics identified at least in part by random sampling of entities in the online social network, information updates published by topical influencers of these topics, information updates relevant to the first user based on one or more transient states of the first user, etc.

In some implementations, the information updates and/or other social network data identified in block 412 may be identified as highlights to be received at block 304 of method 300. In some other implementations, the information updates and/or other online social network data may be further filtered based on one or more second parameters to produce a more relevant set of information updates and/or other online social network data. In FIG. 4, at block 416, one or more second parameters can be received. Examples of second parameters can include parameters that indicate a trend and/or popularity of the information updates or other social network data. For example, a second parameter may include a threshold timeframe in which the information update or other social network data was published, modified, or accessed (e.g., past hour, week, or day). In another example, a second parameter may include a threshold number of times the social network data is commented on, shared, accessed, etc. Further examples of second parameters can include parameters that indicate a sentiment associated with the information update or other social network data. Associating sentiments with social network data is discussed further below with respect to FIG. 9. In some implementations, block 416 can be performed as part of block 404.

In FIG. 4, at block 420, the one or more computing devices performing method 400 are configured to apply the second parameter or parameters of block 412 to one or more attributes of the information updates or other social network data identified in block 412. In some implementations, block 420 can be performed as part of block 408. In FIG. 4, at block 424, any information updates or other social network data having one or more attributes satisfying the one or more second parameters at block 420 are identified by the computing device or computing devices performing method 400 as being highlights from the highlight source. In some implementations, block 424 can be performed as part of block 412.

In FIG. 3, in one example, an on-demand service environment includes one or more processors configured to perform part or all of blocks 404-420 for each or highlight source or multiple highlight sources. For example, an on-demand service environment 200 of FIGS. 2A and 2B may include an inner circle highlights processor, a global influence highlights processor, a topical highlights processor, and a serendipity highlight processor.

Figure 7:
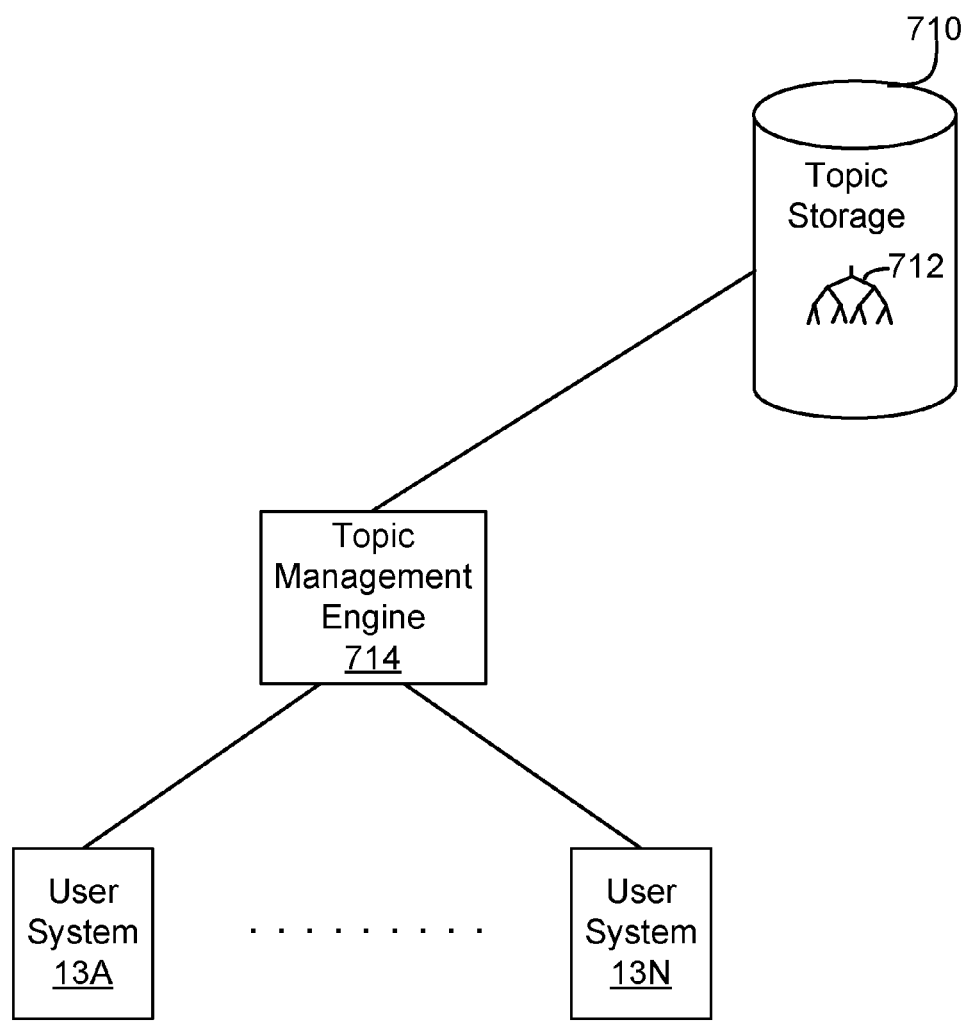
FIG. 7 shows an example of an environment 10 including components for managing topics in an online social network according to some implementations.

As indicated above, in some implementations one or more of blocks 308 and 312 in method 300 can include retrieving associated topics from a storage media of the online social network. FIG. 7 shows an example of an environment 10 including components for managing topics in an online social network. Environment 10 includes topic storage 710, topic management engine 714, and user systems 13A-13N. Topic storage 710 and topic management engine 714 can be components of a database system, as described above with respect to FIGS. 1A and 1B. User systems 13A-13N can interface with topic management engine 714, for example, via a network, also as described above with respect to FIGS. 1A and 1B. For example, as a user submits information updates such as posts, comments, indications of the user's personal preferences, updates to a user's status, updates to a record, uploaded files, and hyperlinks to social network data or other network data such as various documents and/or web pages on the Internet, the topic management engine can associate the information update with one or more topics in topic library 712 of topics. Topic library 712 of topics can be stored in topic storage 710 in any suitable data structure. In some implementations, topics can be stored in a hierarchical data structure, such as an ordered tree structure, e.g., a B-tree structure or a binary tree structure, and the like. The hierarchical data structure can include one or more top level categories, such as department, product, client, location, etc. each of which can have multiple levels of topics. In some implementations, topics may be stored in one or more database tables.

According to various implementations, library 712 can be a closed or open library. For example, in some implementations, a topic library 712 may include only a closed set of topics that may be associated with social network data. A closed topic library may be updated periodically, for example, by the system or an administrator. In some implementations, a user may submit any topic for inclusion in an open topic library 712, for example, by tagging a post with the topic. According to various implementations, a topic library 712 may be updated immediately on user submission or after review by a system administrator.

In some implementations, a user may associate a topic with an information update or other social network data, including information updates submitted by the user and/or other users. In some implementations, the topic management engine 714 may automatically associate one or more topics with user-submitted information updates, e.g., by frequency or occurrence of keywords, phrases, symbols, etc. within a message, post, conversation thread, or other information update. In some implementations, associations of topics with information updates and other social network data may be stored in one or more database tables. FIG. 8 shows an example of a topic table 800 that may be used in tracking information updates and topic associations in accordance with some implementations. Topic table 800 can have columns of topic ID 801 and associated information update IDs 811. In implementations in which a hierarchical topic structure is used, parent and/or child topics may be stored in the topic table 800. In some implementations, one or more of blocks 308 and 312 in method 300 can include information from a database table such as topic table 800.

In some implementations, data in the online social network may be filtered using sentiment information. For example, if a group of users or users within a group of users express a certain sentiment around a topic, e.g., positive or negative, this can alter whether information sources will be relevant to that user or group of users and/or another user or group of users. Accordingly, in some implementations, sentiment information can be used in block 312 of method 300.

Figure 9:
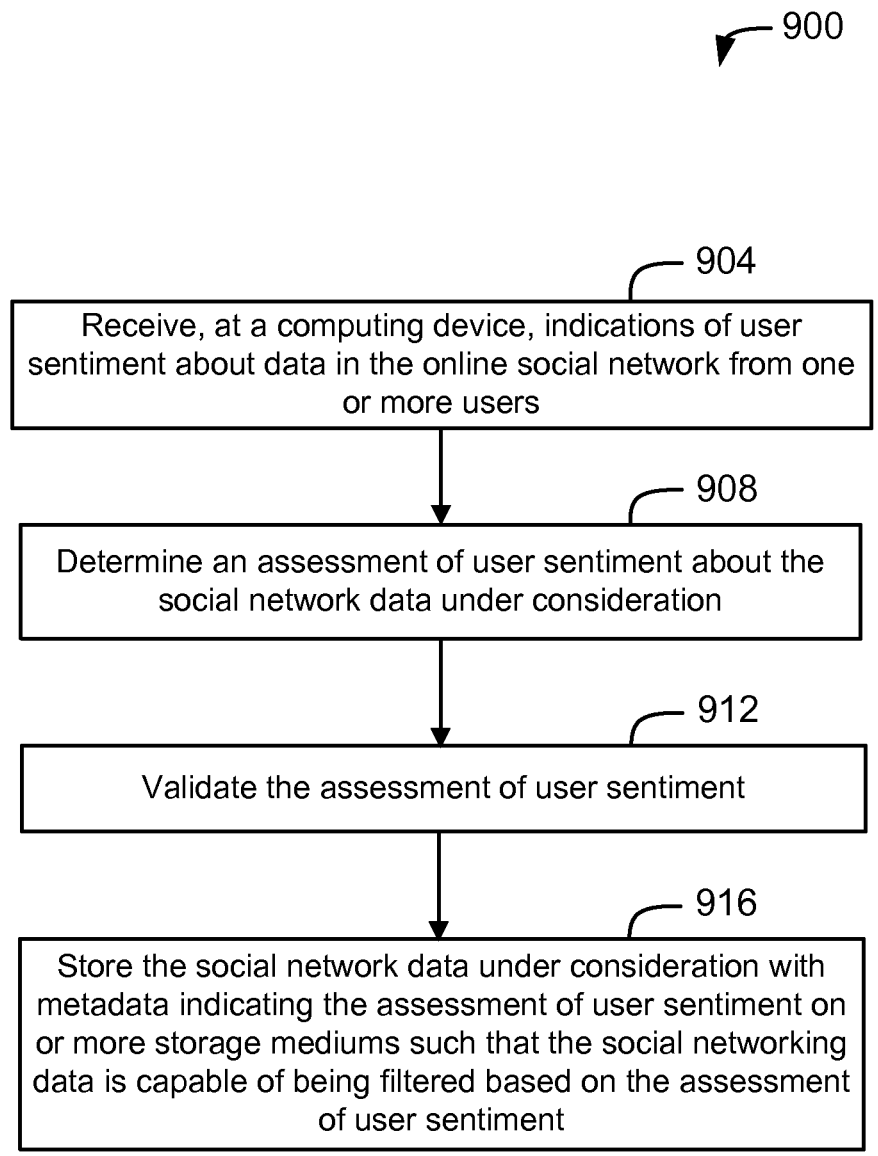
FIG. 9 shows a flowchart of an example of a computer implemented method 900 for obtaining assessments of user sentiment in an online social network, performed in accordance with some implementations.

FIG. 9 shows a flowchart of an example of a computer implemented method 900 for obtaining assessments of user sentiment in an online social network, performed in accordance with some implementations. At block 904, a computing device or any number of computing devices cooperating to perform method 900 receives indications of user sentiment about data in the online social network from one or more users. Information about user sentiment can be received for social network data, including social network data from one or more highlight sources as described above. For example, indications of user sentiment about one or more events, posts, messages, conversations, entities, records, updates to records, uploaded files, products, advertisements, multimedia data, and other data in the online social network can be received. Also, various indications and types of indications can be received at block 904. In various implementations, an indication can be any user action or inaction related to the data in question. For example, an indication of user sentiment about an event such as converting a lead to an opportunity can be the user's answer to a survey about the event. In another example, an indication of user sentiment about a multimedia data such as client presentation can be a duration or frequency of the user accessing the client presentation. According to various implementations, the indications may be explicit and/or ambient. Explicit indications include user answers to surveys or other user input data about the social network data in question. Ambient indications include non-explicit user actions or inactions related to the social network data in question. Mouse, finger, and eye movements (or lack thereof) over a display device viewing area that includes the social network data are examples of ambient indications of user sentiment about the social network data.

In some implementations, indications received at block 904 can include information about user sentiment of other users regarding the social network data in question. For example, an indication of user sentiment about an event received in block 904 can include information about other users' sentiments regarding the event. In some implementations, indications received at block 904 can information about the sentiment of a particular user regarding similar social network data. For example, an indication of user sentiment about a product received in block 704 can include information about that user's sentiments regarding similar products.

In some instances, a suitable storage medium stores data used in block 904, including social network data to be analyzed (e.g., record updates, multimedia presentations, etc.) and user sentiment indications (e.g., answers to surveys, duration or frequency of a user accessing the data, information about user sentiments regarding the same or similar social network data, etc.).

In FIG. 9, at block 908, an assessment of user sentiment about the data under consideration is determined. The one or more computing devices performing method 900 can cause the indications of user sentiment to be analyzed to determine the assessment of user sentiment. In various implementations, the analysis can be based on one or more of: explicit indications of user sentiment from one or more users, ambient indications of user sentiment from one or more users, user sentiment information of other users about the social network data, and user sentiment information about other data in the online social network. For example, block 908 can include determining that a user is excited by an opportunity based on a user responding "yes" to the question "Are you excited by this opportunity?" In another example, block 908 can include determining that a user is nervous about a draft presentation based on ambient signals such as the frequency, duration, time of day, day of week, etc. that a user accesses the draft presentation. In further examples, block 908 can include determining that a user is confident about a deal based on information that other users are confident about the deal or determining that a user is interested in a lead based on information that the user is interested in other similar leads.

Depending in part on the number and types of sources of user sentiment indications, an analysis performed in block 908 may be relatively simple (e.g., determining that a user is excited by an opportunity from a user indicating such on a survey) or more complex (e.g., determining that a user is nervous about an opportunity from indications such as the frequency, duration, time of day, etc. that a user accesses relevant data). In some implementations, block 908 can include providing the indications of user sentiment to a data analysis tool. One example of a data analysis tool is Marketing Cloud®, provided by salesforce.com, inc. of San Francisco, Calif. An analysis performed at block 708 can be performed by one or more servers of the online social network or by one or more third party servers.

In various implementations, the results of the analysis can provide an assessment of one or more sentiments of one or more users about the social network data under consideration, including happy, sad, pleased, angry, calm, nervous, excited, bored, engaged, annoyed, interested, uninterested, etc. In some implementations, the assessment can include information about the intensity of one or more sentiments, e.g., it may be determined at block 908 that one or more users are "slightly nervous" about a deal or "extremely interested" in a record update. In some implementations, the assessment can include information about user sentiment along one or more spectra of sentiments. For example, an assessment of user sentiment may include an indication of the position of the sentiment along a spectrum having extremes of, for example, elation and sadness, surprise and anticipation, trust and distrust, love and hate, intrigue and boredom, etc.

In FIG. 9, at block 912, the assessment of user sentiment about the data under consideration is validated. The one or more computing devices performing method 900 can cause the assessment of user sentiment to be validated, e.g., by providing a prompt to a user, analyzing indications of user sentiment not considered in block 908, or sending such indications of user sentiment to a system for analysis. In various implementations, the assessed user sentiment may be validated by comparing it with one or more of: explicit responses or acknowledgements by the one or more first users regarding the assessment, one or more ambient indications of the user sentiment about the social network data under consideration, information about user sentiment of other users regarding the social network data under consideration, and information about the sentiment of the one or more first users regarding similar social network data.

In some implementations, the validation at block 912 can be performed as part of block 908, using the same data analysis tool, or as an independent process. In some implementations, for example, a data analysis tool may be employed in block 908 to determine that a user is excited by a document in the online social network based on the duration of time the user spends viewing the document, the number of times the user accesses the document, the types of devices that the user uses to access the document, and the number of people with whom the user shares the document, with block 912 involving providing a prompt such as "are you excited?" that asks the user to acknowledge and accept the assessment of her sentiment.

Additional examples of ambient indications of user sentiment include indications of the following: a duration of the data under consideration being in viewing area of a display, whether the data is downloaded, mouse position or movement over a viewing area including the data, finger position or movement over a viewing area including the data, whether a user eye is focused on the data, a duration of a user eye being focused on the data, focused eye position or movement over a viewing area including the data, a user volume adjustment associated with the data, a duration of the data being viewed relative to other data in the online social network, the frequency that a user accesses the data, a number of times the user accesses the data, a number of devices used by the user to access the data, the types of device used to access the data, whether the user is stationary or moving while accessing the data, a change in user behavior associated with the data, whether the user shared the data with one or more other users, whether the user associated topics with the data, the number and identity of topics the user associated with the data, whether the user commented on the data, one or more keywords in a user comment associated with the data, the time of day that the data is accessed, the day of the week the data is accessed, the time of year the data is accessed, and one or more geo-locations from which the user accessed the data.

For example, if the data under consideration is a document posted to a feed of a user, ambient indications of user sentiment can include whether the user accesses the document, how many times the user accesses document, how long the document is in a viewing area of the display device, how many times the user clicks or drags a mouse on or over the document while the document is in a viewing area, how quickly the user scrolls through the document, whether the user edits the document, if the user accesses the document from one or locations (e.g., work, home, or a remote location), and the devices from which the user accesses the document. Additional indications may be received from devices configured for motion tracking, eye tracking, voice recognition, and the like. For example a vocal command to edit the document or a vocal reaction to the document may be an indication of user sentiment.

In FIG. 9, at block 916, data identifying the social network data under consideration and the assessment of user sentiment indicated in block 912 can be stored on a suitable storage medium such as tenant data storage 22 and/or system data storage 24 of FIGS. 1A and 1B or any of the various databases and/or memory devices disclosed herein for use in filtering social network data. For example, assessments of user sentiment may be employed at block 312 of method 300 to determine relevant highlights or other social network data to be presented to a user, or as one or more parameters used in blocks 412 or 420 of method 400. In some implementations, information updates and metadata indicating their associated user sentiment can also be stored in one or more database tables that can be accessed to retrieve relevant information as part of a display feed. For example, a database table stored on a suitable storage medium can store one or more information updates in rows, with one or more columns identifying user sentiment information.

Figure 10A:
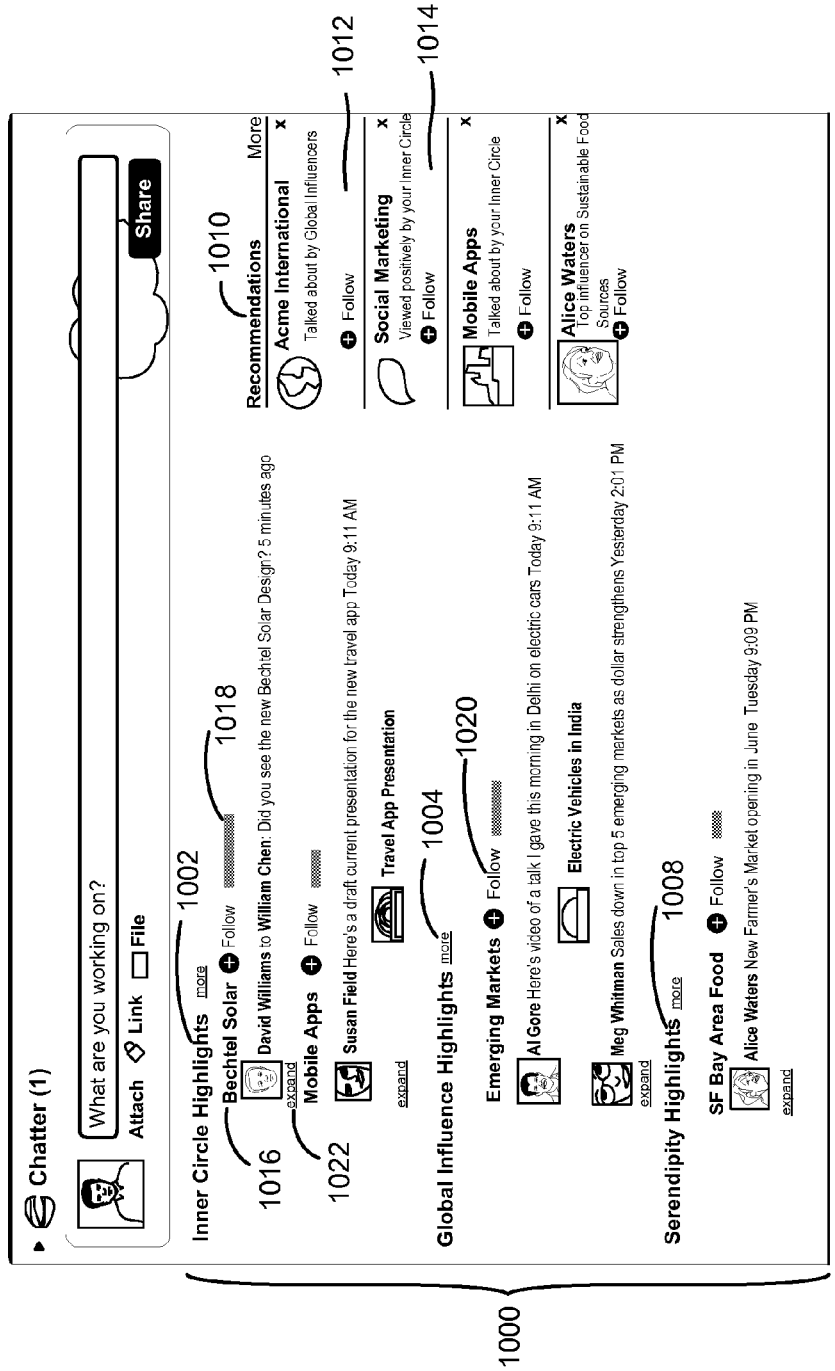
FIG. 10A shows an example of a feed 1000 displaying social network data derived from multiple highlight sources according to some implementations.

FIG. 10A shows an example of a feed 1000 displaying highlights from multiple highlight sources according to some implementations. The feed 1000 includes highlights from three highlight sources: inner circle highlights, global influence highlights, and serendipity highlights. In the example of FIG. 10A, the highlights are displayed with an indication of their highlight source; for example, an indication 1002 of inner circle highlights is shown. In alternate implementations, highlights from multiple sources may be presented without an indication of the highlight sources. Inner circle highlights include topics "Bechtel Solar" and "Mobile Apps", global influence highlights includes the topic "Emerging Markets", and serendipity highlights include the topic "SF Bay Area Food". In some implementations, a visual indicator 1018 may show relative popularity or trending of each topic.

Figure 10B:
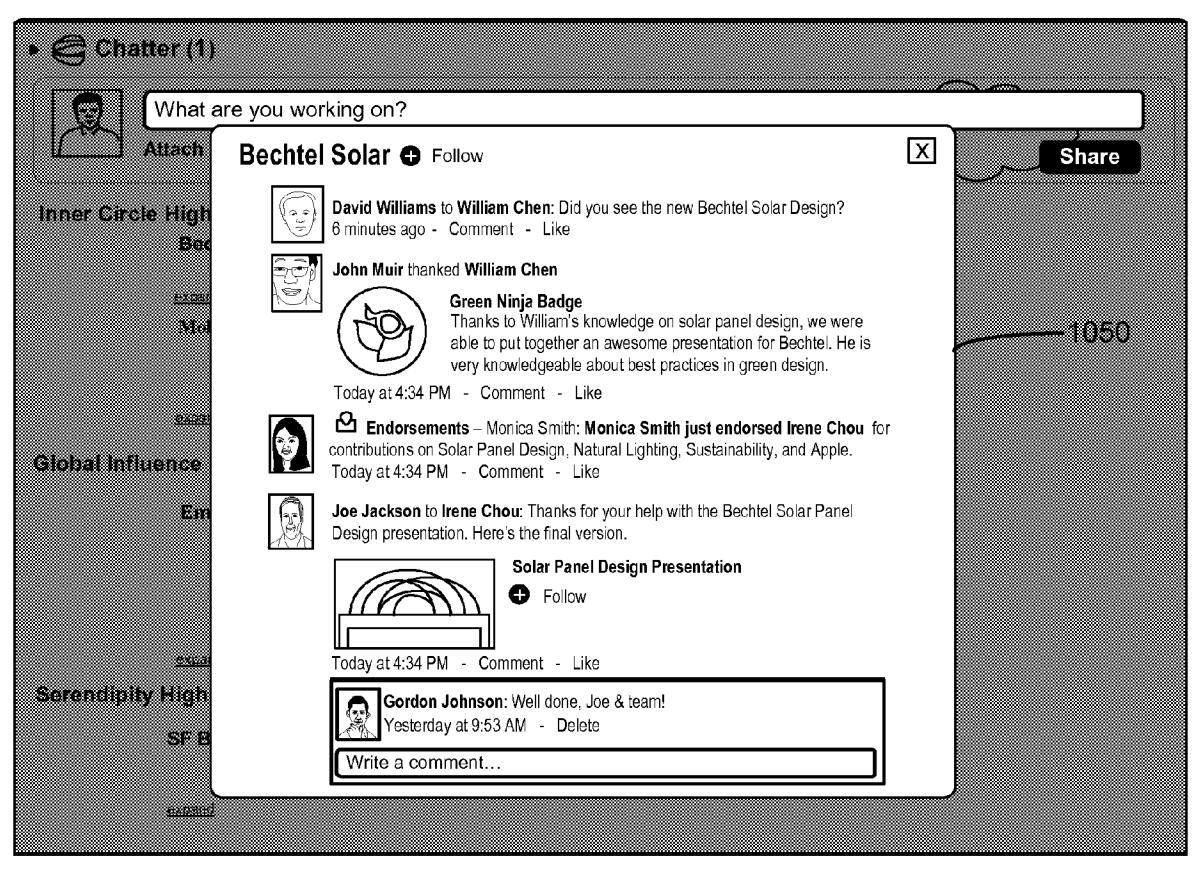

Also in the example of FIG. 10A, one or more associated information updates is displayed with each topic. For example, at 1016, a portion of a conversation between David Williams and William Chen regarding the new Bechtel solar design is displayed. In another example, posts from Al Gore and Meg Whitman associated with the topic Emerging Markets are displayed. By clicking on a link, a user can expand the display of information updates associated with a topic. For example, by clicking on a link 1022, a user can see further information updates related to Bechtel Solar, either in the feed 1000, as an overlay of the feed 1000 or as a separate window, depending on the desired implementation. FIG. 10B shows an example of such an overlay window 1050. A user may also expand the highlights from any particular highlight source by clicking a link such as link 1004.

Further, in FIG. 10A, the data sent to the display device may also include recommendations 1010 of other users, topics, groups, or other objects to follow. For example, in region 1012 is a recommendation that the user follow a company, Acme International. In some implementations, a recommendation may include an indication of a highlight source used to provide the recommendation; in region 1012, there is an indication that global influencers are talking about Acme International. A recommendation to follow a topic, Social Marketing, based on positive sentiment from the user's inner circle regarding the topic, is shown in region 1014.

In some instances, in addition to or instead of providing a recommendation in a GUI, for instance in the form of a pop-up window, an overlay window, or a separate page as described above, a suitable network communication can be sent to a user system, such as the user's smartphone. Such a network communication can be in the form of an email, a text message, a phone call, or a tweet including a recommendation.

Some implementations of the disclosed systems, apparatus, methods, and computer program products are configured to identify relevant information to present in a feed of an enterprise social networking system. In an enterprise social networking system, users can receive a flow of information through a feed. However, the feed can be inundated with excess information that is not relevant to the user. When irrelevant and/or redundant information is delivered to the user, the user may consume information in a manner that is burdensome, time-consuming, and inefficient. As users work through the feed, it is desirable to provide feed items that are relevant to the user to improve workflow.

Feed items that are relevant to a user may be presented in a dedicated "highlights feed." The highlights feed can be accessible to a user that only includes highlighted feed items identified using the disclosed techniques. The disclosed techniques can be configured to essentially pull "need to know" information out of a universe of feeds and feed items and tailor a feed to have more relevant information. For example, by understanding who the user is, what they work on, and a context in which they work in, relevant information can be delivered to the user that enables them to work in the feed more efficiently.

Figure 11:
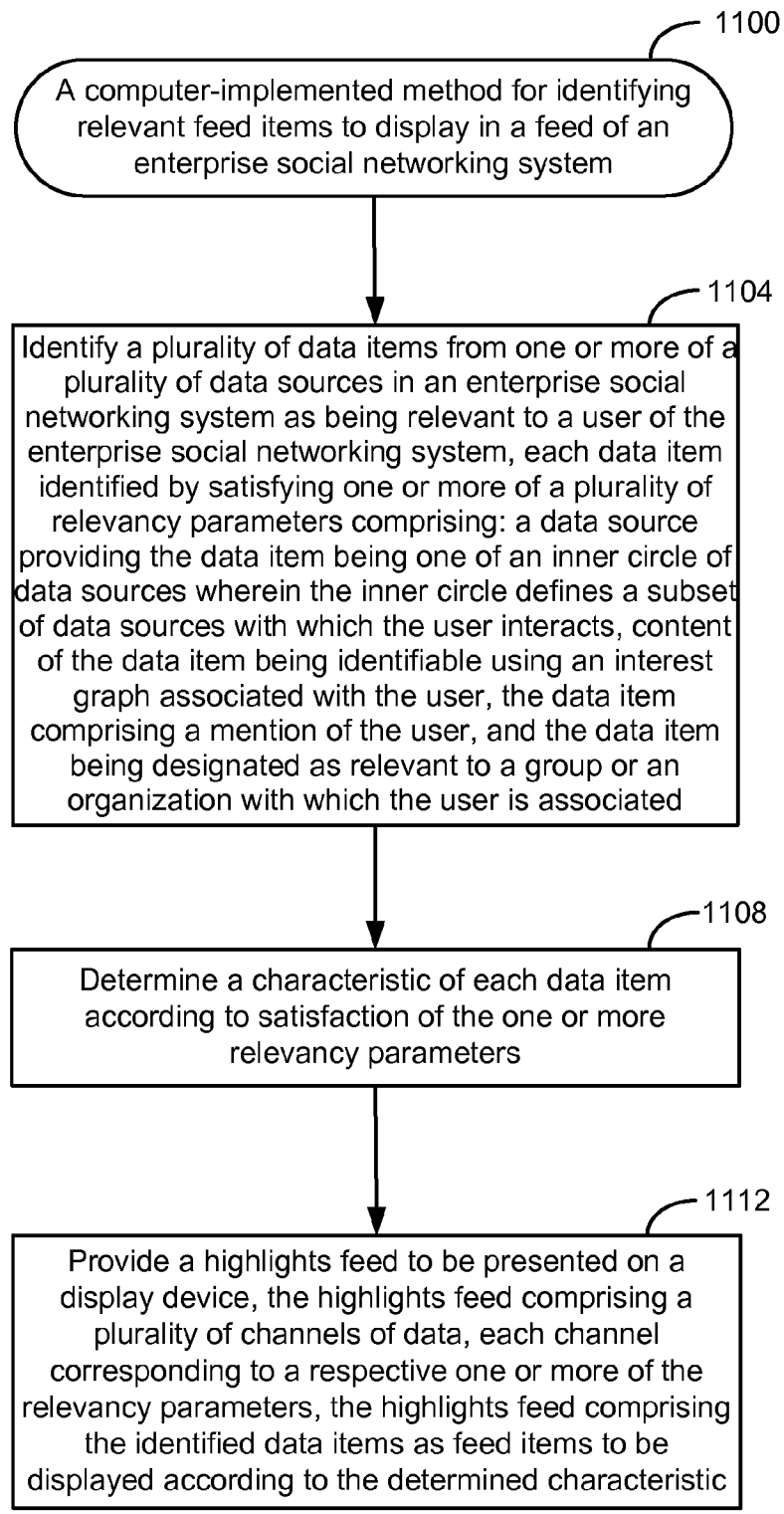
FIG. 11 shows a flowchart of an example of a computer-implemented method 1100 for identifying relevant feed items to display in a feed of an enterprise social networking system according to some implementations.

FIG. 11 shows a flowchart of an example of a computer-implemented method 1100 for identifying relevant feed items to display in a feed of an enterprise social networking system according to some implementations. The operations in the method 1100 may be performed in different orders and/or with different, fewer, or additional operations. The method 1100 may be described with reference to FIGS. 12 and 13.

At block 1104, a plurality of data items are identified from one or more of a plurality of data sources in an enterprise social networking system as being relevant to a user of the enterprise social networking system. Each data item is identified as being relevant by satisfying one or more of a plurality of relevancy parameters comprising: a data source providing the data item being one of an inner circle of data sources wherein the inner circle defines a subset of data sources with which the user interacts, content of the data item being identifiable using an interest graph associated with the user, the data item comprising a mention of the user, and the data item being designated as relevant to a group or an organization with which the user is associated. Thus, the relevancy parameters may be configured to determine whether the data item is from a data source within an inner circle of data sources associated with the user, whether the data item includes content within an interest graph associated with the user, whether the data item includes a mention of the user, and whether the data item is relevant to a group or an organization with which the user is associated.

Relevant information can come from a variety of data sources in an enterprise social networking system. The data sources can include, for example, users, groups, organizations, files, records, topics, and other entities. Events occurring in the enterprise social networking system can cause an update to one or more data sources. A data item can include content representing the event and can be included in a feed item. Data items can include, for example, conversations, posts, comments, indications of a personal preference such as likes or dislikes, updates to a user's status, updates to a record, uploaded files, and hyperlinks to social network data or other network data such as various documents, records, or web pages.

One of the relevancy parameters for determining whether the data item is relevant is whether the data item is from a data source within an "inner circle." The inner circle can include users, groups, communities, database records, and combinations thereof with which the user interacts with at or exceeding a designated frequency in the enterprise social networking system. Determination of the users, groups, communities, and database records with which the user interacts with at or exceeding a designated frequency can be ascertained from user behavior. The designated frequency can establish the threshold in which users, groups, communities, and database records can be a part of the user's inner circle. The designated frequency can be indicative of the users, groups, communities, and database records that the user interacts with the most.

The inner circle can identify users and entities with which a given user works closely, often in the setting of an organization or group. While a user may follow one or more users and entities in an enterprise social networking system, this may not necessarily be indicative of whether such users and entities are part of the user's inner circle. Various criteria for constructing an inner circle can vary from organization to organization, or from group to group. Moreover, how many users and entities may be part of the inner circle can vary from organization to organization, or from group to group.

To determine the users, groups, communities, and database records with which the user interacts with the most, interaction data can be collected regarding user activity with respect to a particular user, group, community, or database record. The interaction data can be indicative of certain user activity that can include but is not limited to: (1) commenting on posts by a particular entity, (2) @mentioning a particular entity, (3) updating or posting on database records owned or associated with a particular entity, (4) sharing information with a particular entity, (5) following a particular entity, and (6) posting messages to a feed of a particular entity. The interaction data can be based on explicit user activity, such as clicking on a link. However, interaction data may also be based on implicit user activity, such as performing a mouse-over of a given location, a duration of time the user views a designated area of content, a viewing of comments on a message, a selection of text or an image, a copying of text in a feed, an expansion of long messages, or a zooming in on a portion of a page. In some implementations, the interaction data can be collected using a client software or a browser plug-in.

When the interaction data of user activity with respect to a given entity is collected, the interaction data can be aggregated to determine a statistical pattern. The data can be aggregated according to a predefined metric. One or more weights can be applied to the metric so that some user activity is more weighted than others. In some implementations, the metric can provide a value to determine if the given entity belongs in a user's inner circle. If the value reaches or exceeds a certain threshold for a given entity, then the given entity can be part of the user's inner circle.

In some implementations, a pop-up window or notification can be displayed recommending a user, group, community, or database record to the user's inner circle. The recommendation can be based on the metric that determines if a given user, group, community, or database record reaches or exceeds a certain threshold. The user may accept or decline to add the given user, group, community, or database record to the inner circle.

The inner circle can provide information regarding those that the user works most closely with, those that the user reports to, and/or those that are most critical for the user to know what they are doing. Even though a user can be following any number of other users and entities and can be part of any number of groups or communities, the inner circle associated with the user can define those that the user works most closely with. In fact, the interaction data may provide information regarding not only the inner circle associated with the user, but the roles/responsibilities of the user, the tasks/projects the user is working on, and the user's position.

Another one of the relevancy parameters for determining whether the data item is relevant is whether the data item includes content within an interest graph associated with the user. In an enterprise social networking system, what's most interesting to a user, organization, or group can be determined and maintained in a database. The database can store interest data for a user, an organization, or a group in the enterprise social networking system, where the interest data can be aggregated to form an interest graph for the user, the organization, or the group. In some implementations, the interest data can be based on interactions by the user with respect to one or more subject matter. In some implementations, the one or more subject matter may be referred to as "topics." FIG. 7 shows an example of an environment for managing topics in an enterprise social networking system.

Data items from a data source can include content associated with a particular subject matter. The subject matter or topics may be stored as one or more data entries in a database in the enterprise social networking system. The database can provide an index of topics that can be continuously updated. Updates to the index of topics can be made by user activity or system-generated. In one example, a user can specify a topic for a data source, and that topic can be added to the index of topics in the enterprise social networking system. In another example, content in a data source can be processed and analyzed to ascertain a topic, and the topic can be added to the index of topics in the enterprise social networking system. Topics can serve as data sources themselves, such that each topic in the enterprise social networking system can have its own feed.

Data sources in the enterprise social networking system can be associated to one or more topics. In some implementations, the association can be made by a machine learning algorithm. A machine learning algorithm can process, for example, content in a data source, metadata associated with a data source, and context surrounding a data source to identify one or more appropriate topics for the data source. In some implementations, data items can be associated with their own topics.

In some implementations, a corpus of text in the content of the data item or data source can be processed. Such processing can be executed by one or more processors associated with one or more computing devices. The corpus of text may include words, phrases, or word combinations that can be intelligently linked or otherwise associated with one or more topics. For example, an analysis of text in the corpus of text may include comparing the text to a text-to-topic association (e.g., word-topic pair). A more detailed description can be found in U.S. application Ser. No. 14/018,107 entitled "Computer Implemented Methods and Apparatus for Identifying a Topic for a Text" to Palmert et al., the entirety of which is incorporated by reference herein and for all purposes.

In some implementations, metadata of a data source to determine one or more appropriate topics can be processed. Such processing can be executed by one or more processors associated with one or more computing devices. The metadata can include data fields such as tags, keywords, title, author, description, topics, date created, date modified, followers, and the like. The metadata can be processed to be linked or otherwise associated with one or more topics. In some implementations, the metadata can be processed using a text-to-topic association to determine one or more appropriate topics.

In some implementations, a context surrounding a data source can be processed. Such processing can be executed by one or more processors associated with one or more computing devices. A context can refer to information about a data source based on how the data source is used in the enterprise social networking system. For example, such information can include who is accessing the data source, who is searching for the data source, who is sharing the data source, where the data source is being surfaced, what operations are being performed on the data source, and what comments are being made about the data source. Such context can provide contextual data that can be processed so that the data source can be linked or otherwise associated with one or more appropriate topics.

In some implementations, the interest data for a user can be ascertained by user activity. The user activity itself can be indicative of the user's interests. For example, the user can post messages on certain subject matter and perform searches of certain subject matter. To illustrate, a user may perform searches for Android devices, and the interest graph may reflect the user's interest in Android. In addition or in the alternative, the user's interests can be ascertained by user activity on data sources associated with one or more subject matter. User activity such as commenting, posting messages, updating, sharing, following, deleting, accessing, liking/disliking, clicking, viewing, selecting, copying, expanding, zooming in, and otherwise interacting with content in one or more data sources may be collected to provide interest data for a user. As data sources may be associated with one or more subject matter, the user activity can be indicative of the user being interested in the one or more subject matter. To illustrate, a user may post several comments on feeds related to Android Java development, a user may spend 70% of his time on Android Java development articles, or a user may perform several updates to an account related to Android sales. An interest graph may reflect the user's interest in Android. In some implementations, the interest data to generate an interest graph can be collected using a client software or a browser plug-in.

While the user activity can be collected with respect to data sources already associated with one or more subject matter, some data sources may not be associated with one or more subject matter. In fact, if the data sources are not associated with one or more subject matter, a machine learning algorithm or other system process can be used to associate one or more subject matter with the data sources. Or, users may assign one or more subject matter to the data sources. Either way, subject matter (e.g., topics) can be generated as users interact with the data sources.

When the interest data for a user is collected, the interest data can be aggregated to determine a statistical pattern. The interest data can be aggregated according to a metric. In some implementations, the metric can weight the interest data so that some user activity is more weighted than others. In some implementations, the metric can provide an interest profile or interest graph, where the interest profile or interest graph provides the subject matter that the user is most interested in. For example, the interest profile or interest graph can show the top 3, top 5, or top 10 topics the user is most interested in and to what degree. The interest profile or interest graph associated with the user identifies subject matter with which the user interacts with at or exceeding a designated frequency in the enterprise social networking system. Thus, the interest profile or interest graph associated with the user can include any number of subject matter that the user interacts with at a certain level of frequency in the enterprise social networking system.

Another one of the relevancy parameters for determining whether the data item is relevant is whether the data item is relevant to a group or an organization in which the user is a part of. While a user may desire to consume information in a feed that is relevant, not every piece of information that is relevant to the user is based on the user's interests or based on those within the user's inner circle. In some instances, there can be information that is important or otherwise relevant to a group or organization that falls outside the scope of the user's interest graph and outside of the user's inner circle. For instance, some information the user may not be interested in, but the user needs to know.

In an enterprise social networking system, communications can be distributed to members of a group or an organization. Some of the communications can be distributed to a selected set of members of the group or organization. The communications can vary in their degree of importance, with some communications being very important across a broad audience, some communications being very important across a limited audience, and some communications being marginally important across a broad audience or limited audience. In some implementations, whether the communication is important or not can be determined by the author of the communication. In some implementations, whether the communication is important or not can be determined by recipients of the communication. For example, a visual feedback element can be provided in the communication to allow recipients to indicate whether the communication was relevant to them or not. A machine learning process can determine the importance of the communication based on the responses of the recipients.

Communications distributed to all members of a group or organization or to a limited set of members of a group or organization may be relevant to the user who is a member of the group or organization. Communications can include conversations, posts, comments, indications of a personal preference such as likes or dislikes, updates to a user's status, updates to a record, uploaded files, and hyperlinks to social network data or other network data such as various documents, records, or web pages. It may be desirable to limit communications distributed within a group or organization to be relevant or useful to the user so that the user does not get desensitized to irrelevant or useless information coming from the group or organization. In some implementations, a communication may be deemed relevant across all members of a group or organization. For example, the communication may be labeled or tagged as urgent/important. Relevant communications in a group or organization that may be urgent can include updates for software or updates on opportunities, notifications concerning critical announcements, such as announcements relating to legal compliance. If a company wanted its employees to perform a security update on their computers, then such an announcement may be designated as relevant so that the employees will download the security update. A user in the enterprise social networking system may not see this announcement unless it is labeled urgent by the sender or deemed relevant by other users in the enterprise social networking system.

In some implementations, the communication may be designated as relevant to a limited set of members of the group or organization. The set of members of the group or organization may share one or more attributes together. Using the same example as above, a company may make an announcement to its employees to perform a security update to their computers, but only to employees with Mac computers. A machine learning process may ascertain which employees are likely to find this announcement relevant and target such employees. That is, the machine learning process can learn that a certain subset of employees would likely find this announcement relevant because it turns out that, for example, 85% of software developers in the company own a Mac computer. A more detailed description of targeting communications to certain members of an enterprise can be found in U.S. application Ser. No. 14/180,222 entitled "Distributing Relevant Information to Users of an Enterprise Network" to White, the entirety of which is incorporated by reference herein and for all purposes. In addition or in the alternative, attributes of the user stored in a user profile may directly indicate which employees share certain attributes.

Another one of the relevancy parameters for determining whether the data item is relevant is whether the data item includes a mention of the user. Even though certain feed items and updates may be outside of a user's inner circle, a user's interest graph, and a user's organization or group, a mention may be considered very relevant to the user. An example of mention of a user can include a tag, label, or @mention of the user.

It is to be understood that the aforementioned relevancy parameters are not meant to be limiting, and that the examples should not be taken as definitive or limiting either in scope or setting. Also, it is to be understood that other relevancy parameters may be provided in addition to or in the alternative to the aforementioned relevancy parameters. For example, a relevancy parameter can include whether the data item includes content within an interest graph associated with an organization or group that the user is a part of. An interest graph can be constructed to identify what is most interesting to an organization, group, or department of an organization or group that the user is a part of Thus, what's trending or what's hottest in an organization can be determined. The interest graph may represent interest data of user activity for a plurality of users in the organization or group. Another relevancy parameter can include the data item being related to a record with which the user has a working relationship. In other words, the relevancy parameter can be configured to determine whether the data item is related to a record the user is working on. Similar to tracking interest data, contextual data can be collected to determine what records the user is most focused on. This can determine which projects, leads, opportunities, tasks, etc. that the user is working on in the enterprise social networking system.

With respect to the plurality of data items from a plurality of data sources in an enterprise social networking system, the data items can be stored or configured to be stored in a database of the enterprise social networking system. One or more processors of one or more servers can execute one or more instructions to identify whether any of the data items are relevant to the user according to any of the aforementioned relevancy parameters. In some implementations, data items can include information updates or content, where the information update or content can be processed and identified as relevant to the user. Such data items can be represented as feed items in a feed. In some implementations, identifying the plurality of data items from one or more of a plurality of data sources as being relevant to the user can include applying a filter having the plurality of relevancy parameters. The filter may apply a metric to determine which of the data items may be provided to a highlights feed according to satisfaction of one or more relevancy parameters.

At block 1108 of FIG. 11, a characteristic of each data item is determined according to satisfaction of the one or more relevancy parameters. Some data items may satisfy more than one relevancy parameter, such as two or three relevancy parameters. Some data items may satisfy a given relevancy parameter more than other data items. Accordingly, the characteristic of each data item can vary depending on the degree to which the data item satisfies a relevancy parameter and if the data item satisfies more than one relevancy parameter.

In some implementations, the characteristic is a score associated with satisfaction of the one or more relevancy parameters. The score can be indicative of how relevant, useful, or important the data item should be to the user. The scoring method can reflect the degree to which the data item satisfies a relevancy parameter and whether the data item satisfies more than one relevancy parameter. In some implementations, a metric can calculate the score, where the metric can be predefined or tuned by the user. The metric may be applied by a filter as described above. The scores of the data items can be calculated and compared with one another. If the score of any data item exceeds a threshold value, the data item may be provided to a highlights feed.

The metric can determine the characteristic to be associated to each of the data items satisfying the one or more relevancy parameters. In some implementations, the metric can include one or more weights associated with the one or more relevancy parameters. In some implementations, the method 1100 can further include updating the one or more relevancy parameters or one or more weights associated with the relevancy parameters using one or more of a: machine process, heuristic process, and regression process.

At block 1112 of FIG. 11, a highlights feed is provided to be presented on a display device, the highlights feed including a plurality of channels of data, each channel corresponding to a respective one or more of the relevancy parameters, the highlights feed including the identified data items as feed items to be displayed according to the determined characteristic. The highlights feed can present the most relevant data items to the user, where the data items are represented as feed items and organized in channels of data.

Figure 12:
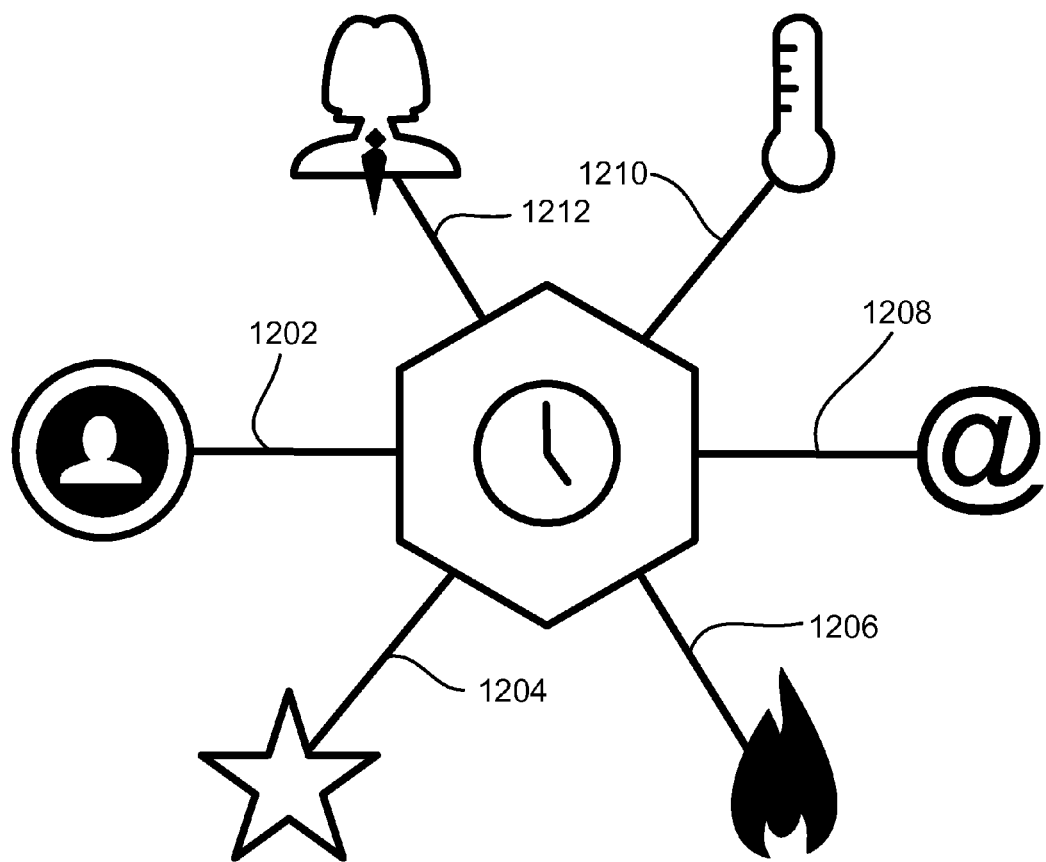
FIG. 12 shows an example of a diagram 1200 illustrating a plurality of different sources of relevant information to display in a highlights feed according to some implementations.

FIG. 12 shows an example of a diagram 1200 illustrating a plurality of different sources of relevant information to display in a highlights feed according to some implementations. The diagram 1200 can be referred to as a "highlights honeycomb." The highlights honeycomb can have communication ports connected to various channels of information to receive data items satisfying one or more relevancy parameters. The diagram 1200 includes a plurality of sources of information for a highlights feed, where the sources of information represent what is considered relevant to a user. The sources of information in the diagram 1200 can include an inner circle 1202, a user's interest graph 1204, an organization's interest graph 1206, an @mention 1208, an urgent organization communication 1210, and a critical work-related communication 1212. The one or more relevancy parameters described earlier herein can define the different sources of information. Therefore, a highlights feed can be structured according to the highlights honeycomb diagram 1200 in FIG. 12.

Figure 13:
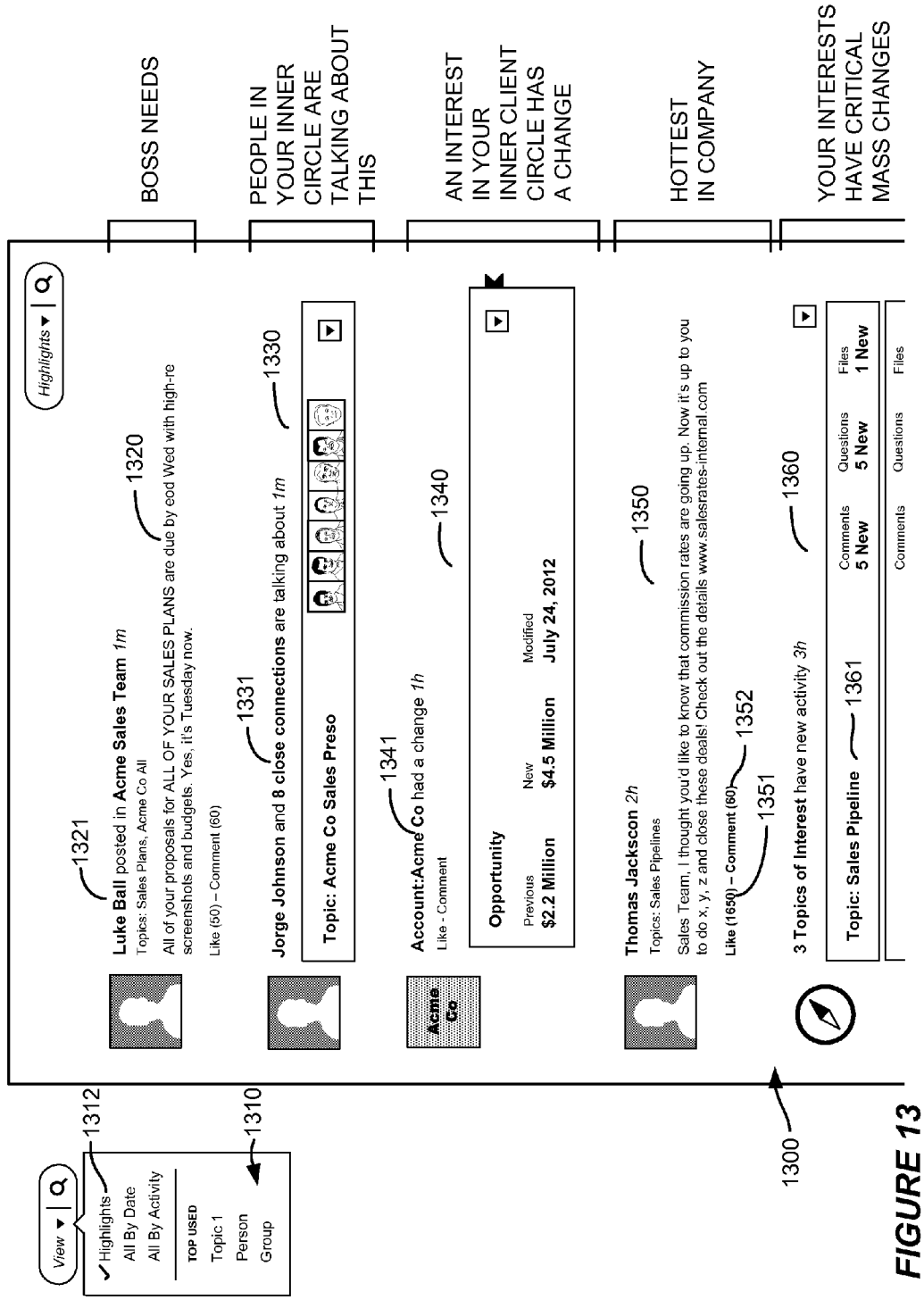
FIG. 13 shows an example of a highlights feed 1300 displaying feed items from multiple data sources according to some implementations.

FIG. 13 shows an example of a highlights feed 1300 displaying feed items from multiple data sources according to some implementations. Typically, a news feed associated with a user profile can display feed items from data sources that the user is following. However, a highlights feed 1300 can be associated with a user profile to display feed items from data sources that are relevant to the user. In some implementations, a user can select Highlights 1312 from a menu 1310 to cause to the highlights feed 1300 to be presented to the user.

The highlights feed 1300 can include a plurality of feed items 1320, 1330, 1340, 1350, and 1360 arranged in channels of data. Each of the feed items 1320, 1330, 1340, 1350, and 1360 represent data items from various data sources in the enterprise social networking system. Each of the data items may satisfy one or more relevancy parameters as described above with respect to FIG. 11.

A first feed item 1320 can include a message posted from the user's boss 1321. The message in the feed item 1320 is posted to the Acme Sales Team. The message in the feed item 1320 may be associated with topics of "Sales Plans" and "Acme Co." The message in the feed item 1320 indicates that proposals are due by a certain deadline, which can suggest that the message in the feed item 1320 may be urgent. What's presented in the feed item 1320 can suggest why the feed item 1320 is in the highlights feed 1300. Nevertheless, why the feed item 1320 is presented in the highlights feed 1300 can be indicated by other visual elements, such as color, score, ranking, etc.

The data item corresponding to the feed item 1320 may satisfy at least one relevancy parameter, and perhaps more. The data item may be from a data source (Luke Ball) who is part of the user's inner circle. In addition, the data item may correspond to a communication distributed within a group or organization, the communication designated as relevant or important. Feed items satisfying such relevancy parameters may be grouped in their own channel in the highlights feed 1300. Moreover, the data item may have a characteristic indicating that the data item is more relevant than other data items because the data source is the user's boss and because the data item is an urgent request.

A second feed item 1330 can include conversations and updates regarding a topic that people in the user's inner circle 1331 are talking about. The topic, Acme Co Sales Preso, can have its own feed. That means that information updates and content regarding the topic can be published as feed items into a feed associated with the topic. In FIG. 13, the people in the user's inner circle 1331 can each have their own interest graph, and the most common topic among those in the user's inner circle 1331 can be provided as a feed item 1330 in the highlights feed 1300. Feed items satisfying the relevancy parameter of being from the user's inner circle 1331 may be grouped in their own channel in the highlights feed 1300.

A third feed item 1340 can include an information update to an account 1341, where the account 1341 can be part of the user's inner circle. The user's inner circle may not be limited to other users, but can include database records. Based on the user's activity, the account 1341 for Acme Co may be determined to be a part of the user's inner circle. Changes in an opportunity under the account 1341 may constitute a data item satisfying the relevancy parameter of being within the user's inner circle. In some implementations, the feed item 1340 may intersect both the user's inner circle and the user's interest graph.

A fourth feed item 1350 can include an announcement distributed throughout the company that the user is a part of. The announcement may constitute a data item satisfying an interest graph of the organization, where the interest data reflects the fact that users in the company are most interested in this announcement. As illustrated in FIG. 13, this can be indicated by the number of likes 1351 and the number of comments 1352. Important or interesting communications within an organization can be grouped as a set of feed items in a channel of the highlights feed 1300.

A fifth feed item 1360 can include content and information updates regarding a topic 1361 within a user's interest graph. Based on the user's activity, interest data may determine that the user is most interested in the topic 1361 of "sales pipeline." Thus, content and information updates regarding the sales pipeline can be provided in its own feed that the user can access in the feed item 1360. The content and information updates can include new comments, questions, and files regarding the sales pipeline. Feed items satisfying the relevancy parameter of being within the user's interest graph may be grouped in their own channel in the highlights feed 1300.

Any of the feed items 1320, 1330, 1340, 1350, and 1360 may be arranged in channels in the highlights feed 1300 corresponding to one or more relevancy parameters. Some of the channels may be arranged higher than other channels. In some implementations, channels may be higher than others depending on the characteristic of each of the data items for each of the channels. In some implementations, channels may be higher than others depending on a user or administrator weighting some relevancy parameters higher than others. For example, a user may want to increase the weight of data items coming from those within the user's inner circle than data items within the user's interest graph. In some implementations, channels may be higher than others depending on if more than one relevancy parameter is satisfied. For example, a data item may intersect a user's inner circle and a user's interest graph, or a data item may be an important communication in the organization and also within the user's inner circle. The more relevancy parameters satisfied by the data item, the higher the feed item can be presented in the highlights feed 1300.

Returning to FIG. 11, the highlights feed provided to the display device associated with the user can be dynamically changed. This can be the result of the user's activity in the enterprise social networking system, other activity occurring in the enterprise social networking system, and the user's input directly on the highlights feed itself. Such activities can lead to changes in the user's interest graph or the organization's interest graph. In addition, some activities can lead to changes in the user's inner circle, the user's context, or what's considered an important communication in an organization or group that the user is a part of. Furthermore, the user can directly change what's displayed in the highlights feed itself by specifying what's relevant and what's not relevant in the highlights feed. This kind of activity can also update the user's interest graph, inner circle, etc.

In some implementations, the method 1100 can further include updating the highlights feed in response to a user input, the user input specifying that at least one of the feed items is not relevant to the user. When the user is presented with the highlights feed, the user can specify whether the feed item is relevant to the user or not. For example, the user can click on a selectable button, icon, image, or link to specify that the feed item is not relevant. In some implementations, the user can specify the aspect of the feed item that is not relevant, such as specifying that a topic in the feed item is not relevant or that a person in the feed item is not within the user's inner circle.

In some implementations, the method 1100 can further include updating the interest graph associated with the user based on user input corresponding to user activity with respect to one of the plurality of data sources. As the user's interest graph can be constructed based on an analysis of the user's historical actions, the user's interest graph can dynamically change according to the user's present actions. For instance, as the user interacts with various records in the enterprise social networking system, the user interaction can suggest that the user is presently most interested in a certain topic that the user was not previously as interested in.

Furthermore, the update to the interest graph associated with the user can cause an update to the characteristic of one or more data items, thereby leading to an update to the highlights feed in relation to the one or more data items having an updated characteristic. In some implementations, the one or more data items can be associated with a subject matter. The update to the user's interest graph can provide the subject matter that the user is presently most interested in, so updates to the highlights feed can occur for data items associated with the same subject matter.

The specific details of the specific aspects of implementations disclosed herein may be combined in any suitable manner without departing from the spirit and scope of the disclosed implementations. However, other implementations may be directed to specific implementations relating to each individual aspect, or specific combinations of these individual aspects.

While the disclosed examples are often described herein with reference to an implementation in which an on-demand database service environment is implemented in a system having an application server providing a front end for an on-demand database service capable of supporting multiple tenants, the present implementations are not limited to multi-tenant databases nor deployment on application servers. Implementations may be practiced using other database architectures, i.e., ORACLE®, DB2® by IBM and the like without departing from the scope of the implementations claimed.

It should be understood that some of the disclosed implementations can be embodied in the form of control logic using hardware and/or using computer software in a modular or integrated manner. Other ways and/or methods are possible using hardware and a combination of hardware and software.

Any of the software components or functions described in this application may be implemented as software code to be executed by a processor using any suitable computer language such as, for example, Java, C++ or Perl using, for example, conventional or object-oriented techniques. The software code may be stored as a series of instructions or commands on a computer-readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer-readable medium may be any combination of such storage or transmission devices. Computer-readable media encoded with the software/program code may be packaged with a compatible device or provided separately from other devices (e.g., via Internet download). Any such computer-readable medium may reside on or within a single computing device or an entire computer system, and may be among other computer-readable media within a system or network. A computer system, or other computing device, may include a monitor, printer, or other suitable display for providing any of the results mentioned herein to a user.

While various implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

What is claimed is:

1. A system for identifying relevant feed items to display in a feed of an enterprise social networking system, the system comprising:

a database system implemented using a server system comprising one or more processors, the database system configured to cause:
identifying from a plurality of data sources associated with an enterprise social networking system:
a first subset of data items as having a first characteristic satisfying a first relevance parameter indicating relevance to a user of the enterprise social networking system, the first relevance parameter identifying an inner circle of data sources as a subset of the data sources with which the user interacts at or exceeding a user-designated frequency,
a second subset of data items as having a second characteristic satisfying a second relevance parameter indicating relevance to the user, the second relevance parameter defined by an interest graph associated with the user, the interest graph maintained as a data structure using one or more data objects in a database to identify topics, feed items and keywords designated as being of interest to the user, and
a third subset of data items as having a third characteristic satisfying a third relevance parameter indicating relevance to the user, the third relevance parameter identifying a group or an organization with which the user is associated;
displaying a highlights feed on a display device, the displayed highlights feed comprising a plurality of channels, each channel graphically identified as associated with a respective relevance parameter, the channels comprising a first channel defined by the first subset of data items, a second channel defined by the second subset of data items, and a third channel defined by the third subset of data items;
updating the interest graph associated with the user based on user input corresponding to user activity with respect to one or more of the plurality of data sources, the updating of the interest graph comprising updating the one or more data objects in the database;
updating the second characteristic based on the updated interest graph;
updating the highlights feed according to the updated characteristic;
identifying a further data source based on an analysis of a combination of the updated interest graph with one or more of a social graph associated with the user or a sentiment graph associated with a user;
generating a recommendation of the further data source as being relevant to the user; and
sending the recommendation to a computing device associated with the user.

2. The system of claim 1, wherein the first characteristic is a score.

3. The system of claim 1, wherein identifying the first, second and third subsets of data items comprises:
applying a filter having the first, second and third relevance parameters.

4. The system of claim 1, wherein the inner circle of data sources comprises: a database record with which the user has a working relationship.

5. The system of claim 1, wherein the second characteristic is content of the second subset of data items being identified by the interest graph.

6. The system of claim 1, the database system further configured to cause:

updating the highlights feed in response to a user input specifying that at least one of the data items in the first, second or third subsets is not relevant to the user.

7. The system of claim 1, the database system further configured to cause:
updating one or more weights associated with one or more of the relevance parameters using one or more of: a machine learning process, a heuristic process, and a regression process.

8. The system of claim 1, wherein the interest graph associated with the user identifies subject matter with which the user interacts at or exceeding a designated frequency.

9. The system of claim 1, wherein relevance of a data item in the third subset to a group or an organization is based at least in part on a level of importance indicated by one or more other users regarding the data item.

10. The system of claim 9, wherein the relevance of the data item in the third subset to the group or the organization is further based on sharing of one or more attributes by the user with the one or more other users.

11. A computer-implemented method for identifying relevant feed items to display in a feed of an enterprise social networking system, the method comprising:
identifying, using a database system, from a plurality of data sources associated with an enterprise social networking system:
a first subset of data items as having a first characteristic satisfying a first relevance parameter indicating relevance to a user of the enterprise social networking system, the first relevance parameter identifying an inner circle of data sources as a subset of the data sources with which the user interacts at or exceeding a user-designated frequency,
a second subset of data items as having a second characteristic satisfying a second relevance parameter indicating relevance to the user, the second relevance parameter defined by an interest graph associated with the user, the interest graph maintained as a data structure using one or more data objects in a database to identify topics, feed items and keywords designated as being of interest to the user, and
a third subset of data items as having a third characteristic satisfying a third relevance parameter indicating relevance to the user, the third relevance parameter identifying a group or an organization with which the user is associated;
causing display of a highlights feed on a display device, the displayed highlights feed comprising a plurality of channels, each channel graphically identified as associated with a respective relevance parameter, the channels comprising a first channel defined by the first subset of data items, a second channel defined by the second subset of data items, and a third channel defined by the third subset of data items;
causing updating of the interest graph associated with the user based on user input corresponding to user activity with respect to one or more of the plurality of data sources, the updating of the interest graph comprising updating the one or more data objects in the database;
causing updating of the second characteristic based on the updated interest graph;
causing updating of the highlights feed according to the updated characteristic;
identifying a further data source based on an analysis of a combination of the updated interest graph with one or more of a social graph associated with the user or a sentiment graph associated with a user;
causing generating of a recommendation of the further data source as being relevant to the user; and
causing sending of the recommendation to a computing device associated with the user.

12. The method of claim 11, wherein identifying the first, second and third subsets of data items comprises:
applying a filter having the first, second and third relevance parameters.

13. The method of claim 11, wherein the inner circle of data sources comprises: a database record with which the user has a working relationship.

14. The method of claim 11, further comprising:
updating one or more weights associated with one or more of the relevance parameters using one or more of: a machine learning process, a heuristic process, and a regression process.

15. A computer program product comprising computer-readable program code to be executed by one or more processors when retrieved from a non-transitory computer-readable medium for identifying relevant feed items to display in a feed of an enterprise social networking system, the program code including instructions configured to cause:
identifying from a plurality of data sources associated with an enterprise social networking system:
a first subset of data items as having a first characteristic satisfying a first relevance parameter indicating relevance to a user of the enterprise social networking system, the first relevance parameter identifying an inner circle of data sources as a subset of the data sources with which the user interacts at or exceeding a user-designated frequency,
a second subset of data items as having a second characteristic satisfying a second relevance parameter indicating relevance to the user, the second relevance parameter defined by an interest graph associated with the user, the interest graph maintained as a data structure using one or more data objects in a database to identify topics, feed items and keywords designated as being of interest to the user, and
a third subset of data items as having a third characteristic satisfying a third relevance parameter indicating relevance to the user, the third relevance parameter identifying a group or an organization with which the user is associated;
displaying a highlights feed on a display device, the displayed highlights feed comprising a plurality of channels, each channel graphically identified as associated with a respective relevance parameter, the channels comprising a first channel defined by the first subset of data items, a second channel defined by the second subset of data items, and a third channel defined by the third subset of data items;
updating the interest graph associated with the user based on user input corresponding to user activity with respect to one or more of the plurality of data sources, the updating of the interest graph comprising updating the one or more data objects in the database;
updating the second characteristic based on the updated interest graph;
updating the highlights feed according to the updated characteristic;
identifying a further data source based on an analysis of a combination of the updated interest graph with one or more of a social graph associated with the user or a sentiment graph associated with a user;

generating a recommendation of the further data source as being relevant to the user; and sending the recommendation to a computing device associated with the user.

16. The computer program product of claim 15, wherein the inner circle of data sources comprises: a database record with which the user has a working relationship.

17. The computer program product of claim 15, the instructions further configured to cause:

updating one or more weights associated with one or more of the relevance parameters using one or more of: a machine learning process, a heuristic process, and a regression process.

18. The computer program product of claim 15, wherein identifying the first, second and third subsets of data items comprises:

applying a filter having the first, second and third relevance parameters.

19. The computer program product of claim 15, the instructions further configured to cause:

updating the highlights feed in response to a user input specifying that at least one of the data items in the first, second or third subsets is not relevant to the user.

20. The computer program product of claim 15, wherein relevance of a data item in the third subset to a group or an organization is based at least in part on a level of importance indicated by one or more other users regarding the data item.

* * * * *